(12) United States Patent
Okada et al.

(10) Patent No.: US 7,166,949 B2
(45) Date of Patent: Jan. 23, 2007

(54) STATOR AND INSULATING BOBBIN AND A MANUFACTURING METHOD OF THE STATOR

(75) Inventors: Tomoyuki Okada, Wako (JP); Minoru Nakajima, Wako (JP); Tatsuro Horie, Wako (JP); Mitsuyoshi Takao, Wako (JP); Hiroyuki Kikuchi, Wako (JP); Takeo Fukuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/340,497

(22) Filed: Jan. 27, 2006

(65) Prior Publication Data

US 2006/0119207 A1 Jun. 8, 2006

Related U.S. Application Data

(62) Division of application No. 10/849,372, filed on May 20, 2004, now Pat. No. 7,026,739.

(30) Foreign Application Priority Data

May 23, 2003 (JP) ............................. 2003-146420
Jun. 25, 2003 (JP) ............................. 2003-181369

(51) Int. Cl.
*H02K 1/00* (2006.01)
(52) U.S. Cl. .................. 310/194; 310/49 R; 310/201; 310/254
(58) Field of Classification Search .............. 310/49 R, 310/194, 179, 208, 216–218, 254, 258–259
See application file for complete search history.

(56) References Cited

U.S. PATENT DOCUMENTS

| 4,520,288 A | 5/1985 | Santi | |
| 5,107,366 A * | 4/1992 | Huang et al. | 359/223 |
| 6,870,292 B2 * | 3/2005 | Owada et al. | 310/194 |
| 2003/0052567 A1 * | 3/2003 | Yonekura | 310/254 |
| 2004/0124733 A1 * | 7/2004 | Yamamoto et al. | 310/218 |
| 2004/0245882 A1 * | 12/2004 | Horie et al. | 310/194 |
| 2005/0029891 A1 * | 2/2005 | Okada et al. | 310/194 |

FOREIGN PATENT DOCUMENTS

| JP | 2000-245092 | 9/2000 |
| JP | 2001-359250 | 12/2001 |
| JP | 2003-79080 | 3/2003 |

OTHER PUBLICATIONS

Chinese Office Action dated Mar. 31, 2006.

* cited by examiner

*Primary Examiner*—Thanh Lam
(74) *Attorney, Agent, or Firm*—Westerman, Hattori, Daniels & Adrian, LLP.

(57) ABSTRACT

An insulating bobbin mounted on a tooth extending from an annular yoke of a stator with a rectangular wire being around the insulating bobbin has a tooth insulating portion for insulating the tooth of the stator and the rectangular wire and an extending portion extending from an end portion of the tooth insulating portion along an inner surface of the yoke, wherein a guide groove for guiding the rectangular wire diagonally relative to a circumferential direction of the tooth insulating portion from an outside of the extending portion is provided in a side of the extending portion on one of axial sides of the stator.

2 Claims, 19 Drawing Sheets

RECTANGULAR WIRE THICKNESS D

STATOR AND INSULATING BOBBIN AND A MANUFACTURING METHOD OF THE STATOR

CROSS-REFERENCE TO RELATED APPLICATIONS

This application is a Divisional application of application Ser. No. 10/849,372, filed May 20, 2004 now U.S. Pat. No. 7,026,739, which invention claims foreign priority to Japanese Patent Application No. 2003-146420 filed on May 23, 2003 and No. 2003-181369 filed on Jun. 25, 2003, the contents of which are incorporated herein by reference.

BACKGROUND OF THE INVENTION

1. Field of the Invention

The present invention relates to a stator for use in rotational electric machines such as electric motors and generators, an insulating bobbin for the stator and a manufacturing method of the stator.

2. Description of the Related Art

Windings for stators include a winding made up of so-called round wire having a circular cross section and a winding made up of so-called rectangular wire having a substantially rectangular cross section.

While the round wire produces a space therebetween even when the wire is wound tightly, the rectangular wire is advantageous over the round wire in that the former can be aligned so as not to produce any space therebetween whereby the space factor can be improved. When used herein, the space factor means a ratio between the cross-sectional area of the slot and an area occupied by the coil wire, and an increase in space factor increase the performance of the rotational electric machine.

The winding formed by winding the rectangular wire is disclosed, for example, in a Japanese Patent Unexamined Publication JP-A-2000-245092.

When forming a stator winding by winding a rectangular wire in an aligned fashion, however, since the surface of the stator winding so formed becomes substantially flat, when the stator winding on an outermost layer protrudes, the stator winding on the outermost layer moves in a widthwise direction, causing a risk that a desired shape cannot be maintained (refer to FIG. 28, a detailed description being provided later on).

On the other hand, Japanese Patent Unexamined Publication JP-A-2001-359250 (refer to paragraph No. 0006 and FIG. 14) proposes a technique for preventing the deviation of a rectangular wire by restricting a widthwise movement of the rectangular wire by holding portions being formed on the rectangular wire so as to protrude therefrom.

Thus, while the rectangular is advantageous in that the space factor can be increased, the rectangular becomes easy or difficult to be bent depending on a direction of its bending. So-called flat-wise bending in which the rectangular wire is bent in a thickness-wise direction thereof provides an easy bending, whereas so-called edgewise bending in which the rectangular wire is bent in a widthwise direction thereof provides a difficult bending. There may be caused a problem to introduce the rectangular wire into an insulating bobbin due to the bending properties of the rectangular wire.

FIG. 17 shows a rectangular wire introducing portion in a conventional insulating bobbin and a start-winding portion of a rectangular wire introduced. In an insulating bobbin 100, extending portions 102, 103 are provided at both ends of a tooth insulating portion being formed in a rectangular tubular shape, and an introduction support portion 104 is provided in an outer side of one 102 of the extending portions.

In a case where a rectangular wire 110 is introduced from an outside in an axial direction of the insulating bobbin 100 while a thickness-wise direction of the rectangular wire 110 is positioned so as to intersect at right angles with a plane-wise direction of a horizontal side 110a of the tooth insulating portion 101, so that the rectangular wire 110 passes through a groove 104a in the introduction support portion 104 and a groove 102a in the extending portion 102 to be wound along a vertical side 101b of the tooth insulating portion 101, the rectangular wire has to be bent at right angles in the groove 102a in the extending portion 102.

In this case, as shown in FIG. 17, when attempting to bend the rectangular wire in the groove 102a using the flat-wise bending, a twist is caused in a bent portion of the rectangular wire 110, and the bent portion that is expanded due to the twist so caused interferes with a winding of an upper layer such as a second layer or upper.

On the other hand, as shown in the same drawing, when winding the rectangular wire for an upper layer while avoiding an interference with the bent portion, a large space (a gap) where there does not exist any winding is produced as shown in FIG. 18, and hence there is caused a drawback that the space factor is decreased.

On the other hand, when bending the rectangular wire 110 in the groove 102a using the edgewise bending, such a bending cannot be implemented with a common winding machine, and therefore, a winding machine having a special construction is required, which increases the production costs. In addition, when using the edgewise bending, since the radius of curvature of the bent portion becomes smaller, there may also be caused a risk that the insulating layer of the winding is damaged.

Also, In the aforesaid conventional technique, since the holding portions are formed on the rectangular wire, a special shape is required which is different from conventional ones, and this calls for a complicated rectangular wire forming process. In addition, since the size of the rectangular wire is increased due to the provision of the holding portion, there is caused a problem that a decrease in space factor is called for.

SUMMARY OF THE INVENTION

The present invention was made to provide a stator and an insulating bobbin which can allow for a smooth introduction of a rectangular wire into the insulating bobbin and which can increase the space factor of the rectangular wire so introduced.

Further, the invention was made in view of these situations, and an object thereof is to provide a stator which can increase the space factor of a stator winding that is formed by winding a rectangular wire and which can maintain the desired shape of the stator winding to thereby enhance the reliability thereof and a method for fabricating the stator.

With a view to solving the problem, according to a first aspect of the invention, there is provided an insulating bobbin mounted on a tooth extending from an annular yoke of a stator with a rectangular wire being around the insulating bobbin, having a tooth insulating portion insulating the tooth of the stator and the rectangular wire and an extending portion extending from an end portion of the tooth insulating portion along an inner surface of the yoke, wherein a guide groove guiding the rectangular wire diagonally relative to a circumferential direction of the tooth insulating portion from an outside of the extending portion is provided in a side of the extending portion on one of axial sides of the stator.

According to the construction, since the rectangular wire can be inserted diagonally from an outside of the extending portion of the insulating bobbin, the rectangular wire can be smoothly wound around the tooth insulating portion on a first turn thereof without edgewise bending the rectangular wire.

In addition, the twisting or forcible bending of the rectangular wire at the portion where the rectangular wire is introduced into the tooth insulating portion 21 can be prevented.

According to a second aspect of the invention, there is provided an insulating bobbin as set forth in the first aspect of the invention, wherein a an inclination angle of the guide groove relative to the circumferential direction of the tooth insulating portion is set equal to or larger than an angle θ which is expressed by the following equation;

$$\theta = \tan^{-1}(Ww/Wt)$$

wherein Ww represents a width of the rectangular wire, and Wt represents a width of the tooth insulating portion.

According to the construction, since there is no risk that the start-winding portion of the first layer is expanded due to curving or bending, the production of a thick winding can be prevented which would otherwise be caused in the event that the rectangular wire for the second layer comes to interfere with the start-winding portion of the first layer when the rectangular wire for the second layer is started to be wound around the tooth insulating portion.

According to a third aspect of the invention, there is provided an insulating bobbin as set forth in the first or aspect of the invention, wherein a bottom surface of the guide groove is made up of an inclined surface which inclines inwardly in the axial direction of the stator as the bottom surface approaches the tooth insulating portion along a longitudinal direction of the guide groove.

According to the construction, the degree of freedom of direction in which the rectangular wire is introduced is expanded.

According to a fourth aspect of the invention, there is provided an insulating bobbin as set forth in the third aspect of the invention, wherein where the bottom surface of the guide groove is made up of an inclined surface which inclines inwardly in the axial direction of the stator as the bottom surface approaches the tooth insulating portion along a widthwise direction of the guide groove, and wherein the bottom surface of the guide groove connects continuously to a side of the tooth insulating portion without any difference in level.

According to the construction, the degree of freedom of direction in which the rectangular wire is introduced is expanded further.

According to a fifth aspect of the invention, there is provided an insulating bobbin as set forth in the first aspect of the invention, wherein an intersection point between an inner side of the extending portion and an outer side of the guide groove is positioned outwardly of a side of the tooth insulating portion where the rectangular wire is bent for the first time by a distance equal to or larger than a thickness of the rectangular wire.

According to the construction, when a first turn of the rectangular wire is wound around the tooth insulating portion, the rectangular wire can be wound therearound closely to the inner side of the extending portion without producing no gap between the wire and the inner side.

According to a sixth aspect of the invention, there is provided an insulating bobbin as set forth in the first aspect of the invention, wherein a height of a highest point of a line of intersection between a rectangular wire for a first layer and a rectangular for a second wire is set equal to or smaller than a height being 1.5 times as large as the thickness of the rectangular wire from the side of the tooth insulating portion.

According to the construction, the rectangular wire of the second layer can ride over the rectangular wire of the first layer in a smooth fashion.

According to a seventh aspect of the invention, there is provided a stator having an insulating bobbin mounted on a tooth extending from an annular yoke of a stator with a rectangular wire being around the insulating bobbin, including a tooth insulating portion for insulating the tooth of the stator and the rectangular wire and an extending portion extending from an end portion of the tooth insulating portion along an inner surface of the yoke, wherein a guide groove for guiding the rectangular wire diagonally relative to a circumferential direction of the tooth insulating portion from an outside of the extending portion is provided in a side of the extending portion on one of axial sides of the stator, wherein the teeth are provided of an annular yoke at predetermined intervals in a circumferential direction, wherein the insulating bobbin is mounted on each of the teeth so provided, and wherein a rectangular wire is wound around the insulating bobbin so mounted.

According to the construction, there can be obtained a stator which can provide an extremely high space factor of rectangular wire.

According to an eighth aspect of the invention, there is provided an insulating bobbin as set forth in the first aspect of the invention, wherein the rectangular wire for an outermost layer is extended diagonally from a start-winding position thereof on one edge side of the insulating bobbin toward the other edge side thereof to the following line so as to straddle a space equivalent to one line so as to provide a recessed portion and then wound around a plurality of turns to form a diagonal extending portion, and thereafter is wound across the diagonal extending portion in a direction in which the rectangular wire diagonally intersects with the diagonal extending portion so as to be wound into the recessed portion.

According to this aspect of the invention, the space factor can be increased by winding the rectangular wire concentratedly in an aligned fashion. In addition, while the external surface of the stator winding becomes substantially flat by winding the rectangular wire concentratedly in an aligned fashion, by winding the rectangular wire for the outermost layer in such a manner as to form the diagonal extending portion and thereafter winding the same rectangular wire in such a manner as to diagonally intersect with the diagonal extending portion to thereby be wound into the recessed portion, the winding that is wound across the diagonal extending portion after the formation thereof is allowed to be accommodated in the recessed portion to thereby restrict the widthwise direction of the winding. Furthermore, since the winding is wound around in such a manner that the portion of the rectangular wire that is wound into the recessed portion and the portion thereof that forms the diagonal extending portion are wound around in such a manner as to intersect with each other, the widthwise movement of the portions are restricted by each other, thereby making it possible to maintain the shape of the stator winding to the desired shape thereof.

According to a ninth aspect of the invention, there is provided an insulating bobbin as set forth in the first aspect of the invention, wherein a chamfered portion is formed at a corner portion of the bobbin and a tapered portion is provided on an inside of the chamfered portion.

According to this aspect of the invention, since the rectangular wire that is wound around in the recessed portion can be guided by the chamfered portion formed on the corner portion and the tapered portion provided on the inside of the chamfered portion, the winding work can by performed more smoothly. Furthermore, the insulating bobbin can be made lighter in weight and smaller in size by forming the chamfered portion. According to a tenth aspect of the invention, there is provided a method for manufacturing a stator including an insulating bobbin having a tooth insulating portion insulating the tooth of the stator and the rectangular wire, an extending portion extending from an end portion of the tooth insulating portion along an inner surface of the yoke and a guide groove guiding a rectangular wire diogonally relative to a circumferential direction of the tooth insulating portion from an outside of an extending portion on one of axial sides of the stator, comprising steps of providing a plurality of teeth on the stator at predetermined intervals in a circumferential direction thereof, mounting insulating bobbins on the plurality of teeth, winding concentratedly a rectangular wire around the insulating bobbin in an aligned fashion, causing a rectangular wire for an outermost layer to extend diagonally from a start-winding position thereof on one edge side of the insulating bobbin toward the other edge side thereof to the following line so as to straddle a space equivalent to one line so as to provide a recessed portion and then winding the rectangular wire a plurality of turns to form a diagonal extending portion and winding the rectangular wire so diagonally extended across the diagonal extending portion in a direction in which the rectangular wire diagonally intersects with the diagonal extending portion so as to be wound into the recessed portion.

According to this aspect of the invention, by winding the rectangular wire concentratedly in an aligned fashion, the space factor can be increased, and by winding the rectangular wire across the diagonal extending portion in such a manner as to diagonally intersect therewith so as to be wound into the recessed portion, the widthwise movement of the winding can be restricted by the recessed portion, and the widthwise movement of the portion of the rectangular wire that is wound into the recessed portion and the portions thereof that form the diagonal extending portion is restricted by each other, thereby making it possible to maintain the shape of the rectangular wire to the desired shape thereof.

According to an eleventh aspect of the invention, there is provided an insulating bobbin mounted on a tooth extending from an annular yoke of a stator with a rectangular wire being around the insulating bobbin, having a tooth insulating portion insulating the tooth of the stator and the rectangular wire and an extending portion extending from an end portion of the tooth insulating portion along an inner surface of the yoke, wherein a guide groove guiding the rectangular wire to the outside is provided in a side where the end-winding end of the rectangular portion is located.

DETAILED DESCRIPTION OF THE PREFERRED EMBODIMENT

Embodiments of stators and insulating bobbins according to the invention will be described below by reference to FIGS. 1 to 16.

[First Embodiment]

Firstly, a first embodiment of a stator and an insulating bobbin according to the invention will be described below by reference to FIGS. 1 to 7.

Figure 1:
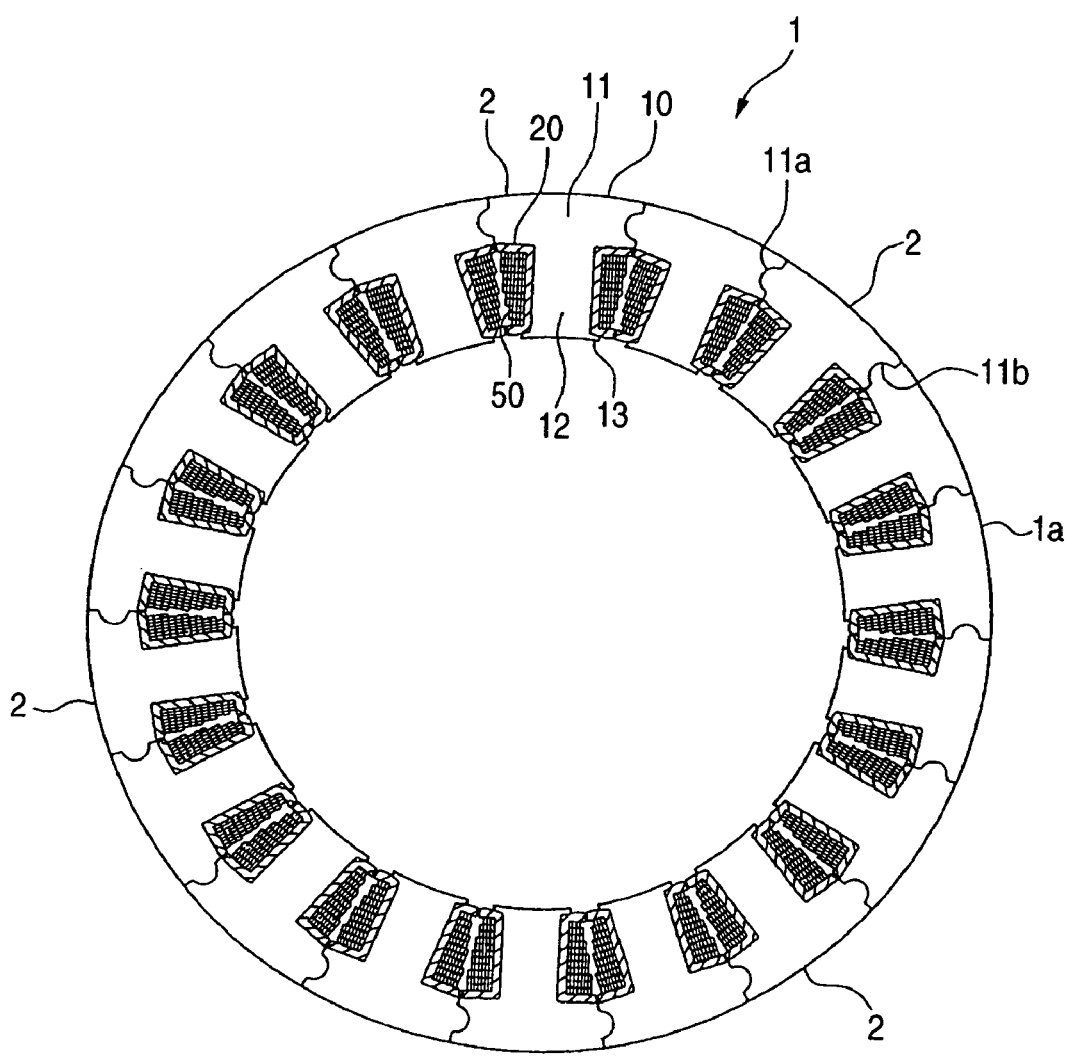
FIG. 1 is an overall cross-sectional view of a stator according to a first embodiment of the invention.

As shown in FIG. 1, a stator 1 is constructed by connecting a plurality of stator modules 2 in an annular shape and is adapted for use in rotational electric machines such as electric motors and generators.

Each stator module 2 includes a stator core 10 made up of a yoke portion 11 and a tooth portion (a tooth) 12, an insulating bobbin 20 mounted on the tooth portion 12 of the stator core 10 and a rectangular wire 50 wound around the insulating bobbin 20.

The yoke portions 11 of the respective stator cores 10 are connected together so as to form an annular yoke 1a of the stator 1. In order to ease the connection of the yoke portions 11, an engaging convex portion 11a is provided on a circumferential end face of the yoke portion, and an engaging concave portion 11b is provided on the other end face thereof for fitting on the engaging convex portion 11a.

The tooth portion 12 is formed so as to have a substantially rectangular cross section an extends from the center of the yoke portion 11 toward the radial center of the stator 1. An extending portion 13 extending in a circumferential direction of the yoke portion 11 is provided at a distal end of the tooth portion 12.

Figure 2:
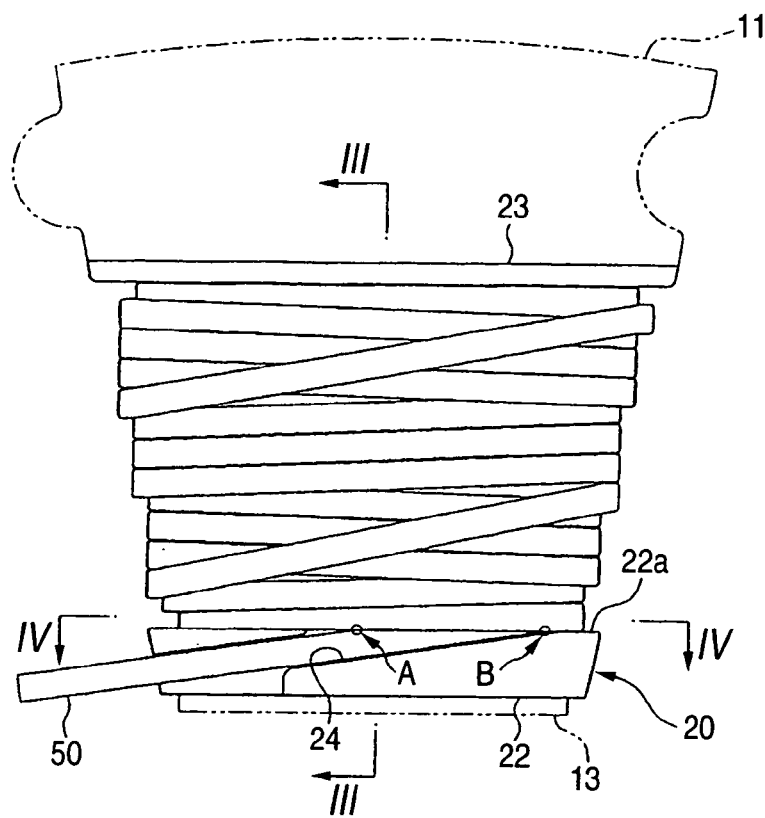
FIG. 2 is a front view showing a state in which a rectangular wire is wound around an insulating bobbin that is used in the stator of the first embodiment.
Figure 3:
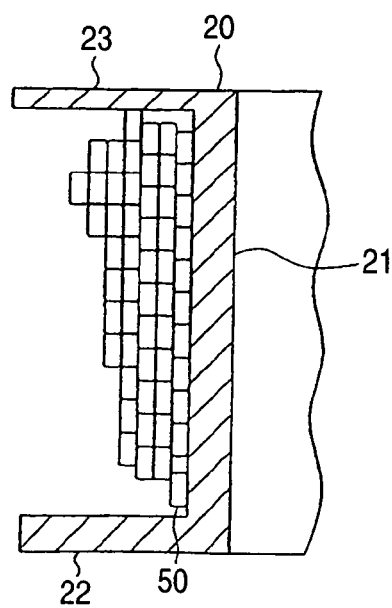
FIG. 3 is a cross-sectional view taken along the line III—III in FIG. 2.
Figure 4:
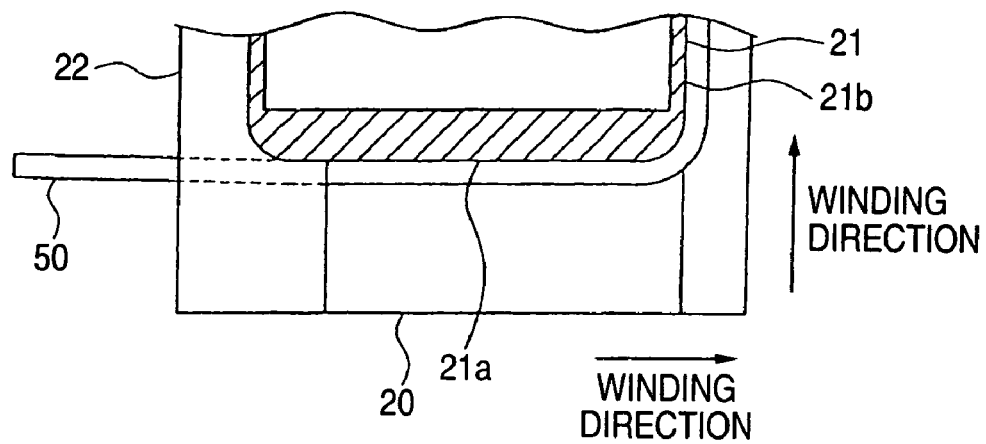
FIG. 4 is a cross-sectional view taken along the line IV—IV in FIG. 2.

As shown in FIGS. 2 to 4, the insulating bobbin 20 includes a tooth insulating portion 21 formed into a rectangular tubular shape and extending portions 22, 23 which extend from axial end portions of the tooth insulating portion 21 along an inner surface of the yoke portion 11. The tooth insulating portion 21 is disposed so as to surround sides of the tooth portion 12, the extending portion 22 is disposed along an inner surface of the extending portion 13 of the stator core 10, and the extending portion 23 is disposed along an inner circumferential surface of the yoke portion 11.

Figure 6:
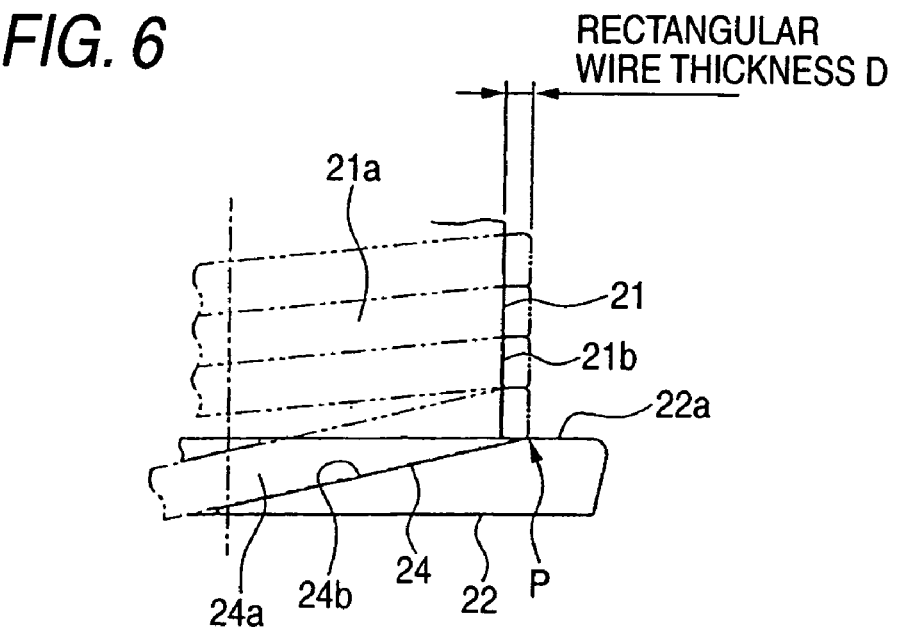
FIG. 6 is a drawing for explaining an intersection point between an outer side of the guide groove and an inner surface of an extending portion.

A rectangular wire introducing guide groove 24 is provided on a side of the extending portion 22 which is on one of axial sides of the stator 1, and the rectangular wire 50 is introduced into the tooth insulating portion 21 through the guide groove 24 from an outside of the extending portion 22 for being wound around a side of the tooth insulating portion 21. Note that, as shown in FIG. 6, the rectangular wire 50 is started to be wound from a side 21a on the one of the axial sides of the stator 1 and is wound to a side 21b on one of circumferential sides of the stator 1. Namely, the rectangular wire 50 is bent on this side 21b for the first time.

Figure 5:
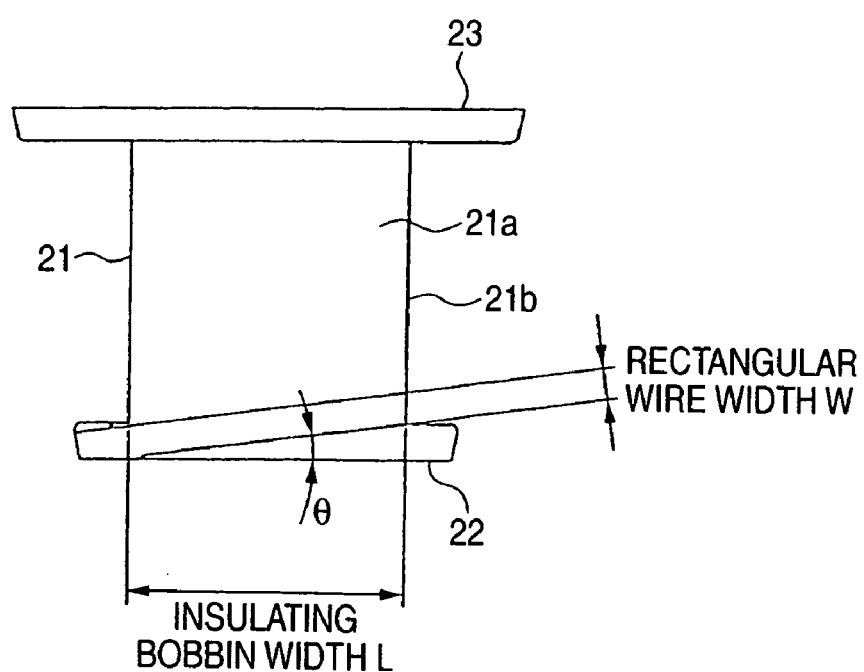
FIG. 5 is a drawing for explaining a minimum angle of a guide groove relative to a tooth insulating portion.

To describe the guide groove 24 in detail by reference to FIGS. 5 and 6, a bottom surface 24a of the guide groove 24 is formed so as to be flush with the side 21a of the tooth insulating portion 21, and the width of the bottom surface 24a is set slightly larger than the width W of the rectangular wire 50. The guide groove 24 is inclined diagonally in the longitudinal direction relative to the circumferential direction of the tooth insulating portion 21 (in other words, in a planar direction of an inner surface 22a of the extending portion 22), and the inclination angle thereof is set equal to or larger than an angle θ, which is expressed by the following equation and equal to or smaller than 30°;

$\theta = \tan^{-1}$ (width W of the rectangular wire/width L of the tooth insulating portion).

The reason why the inclination angle is set in the range is because a portion of the rectangular wire 50 which is before a start-winding portion of a first turn of the rectangular wire 50 constitutes an interruption when a second turn of the rectangular wire 50 is wound around the tooth insulating portion 21, in case the inclination angle is set smaller than θ, whereas in case the inclination angle is set larger than 30°, a bent portion that is produced when the rectangular wire 50 is started to be wound around the tooth insulating portion 21 is expanded, causing a problem in winding the rectangular wire 50 for a second layer or upper.

Furthermore, as shown in FIG. 6, an intersection point P between the inner surface 22a of the extending portion 22 and an outer side 24b of the guide groove 24 is set to be positioned outwardly of the side 21b of the tooth insulating portion 21 where the rectangular wire is bent for the first time by a distance D equal to (or larger than) the thickness of the rectangular wire 50, whereby, when a first turn of the rectangular wire 50 is wound around the tooth insulating portion 21, the rectangular wire 50 can be wound therearound closely to the inner surface 22a without no gap being produced between the wire and the inner surface 22a of the extending portion 22, thereby making it possible to enhance the space factor.

Figure 7:
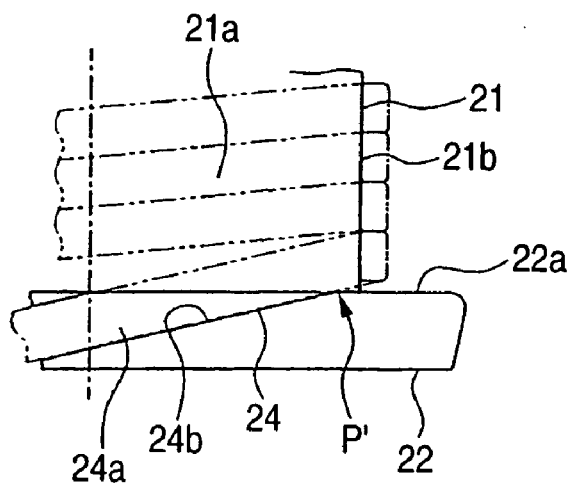
FIG. 7 is a drawing for explaining an intersection point between an outer side of the guide groove and an inner surface of an extending portion in a comparison example.

FIG. 7 is a drawing illustrating a comparison example, and as shown in the drawing, in the event that an intersection point P' between an inner surface 22a of an extending portion 22 and a guide groove 24 is positioned closer to the center than the intersection point P, when the first turn of the rectangular wire is wound along the side 21b of the tooth insulating portion 21, a gap is produced between the rectangular wire 50 and the inner surface 22a of the extending portion 22, this decreasing the space factor.

In the insulating bobbin 20 that is constructed as has been described heretofore, since the rectangular wire 50 can be inserted diagonally from the outside of the extending portion 22 of the insulating bobbin 20 with a bottom side of the rectangular wire 50 being made flush with the side 21a of the tooth insulating portion 21, the rectangular wire 50 does not have to be bent edgewise, and the first turn of the rectangular wire 50 can be smoothly wound around the sides 21a, 21b of the tooth insulating portion 21. Consequently, a winding operation using a simple winding machine is made possible.

In addition, since the first turn of the rectangular wire 50 can be smoothly wound around the sides 21a, 21b of the tooth insulating portion 21, the necessity is obviated of twisting or forcibly bending the rectangular wire 50 at the portion where the rectangular wire 50 is introduced into the tooth insulating portion 21, which has been carried out conventionally, and hence there is eliminated a risk that an insulating layer formed on the surface of the rectangular wire 50 is damaged.

Additionally, since there is caused no forcible bending on the rectangular wire 50 at the portion where the rectangular wire 50 is introduced into the tooth insulating portion 21 and on the first turn of the rectangular wire 50, there is eliminated a risk that the introducing portion and the first turn of the rectangular wire 50 interfere with a second turn of the rectangular wire 50 when winding the rectangular wire 50 on the second turn, and as shown in FIG. 3, there is no risk that a lower layer interferes with an upper layer when winding the rectangular wire 50 for a third layer or upper, whereby the space factor can be enhanced.

Consequently, in the stator 1 having the insulating bobbin 20, the space factor of the rectangular wire 50 can be increased extremely high.

[Second Embodiment]

Figure 8:
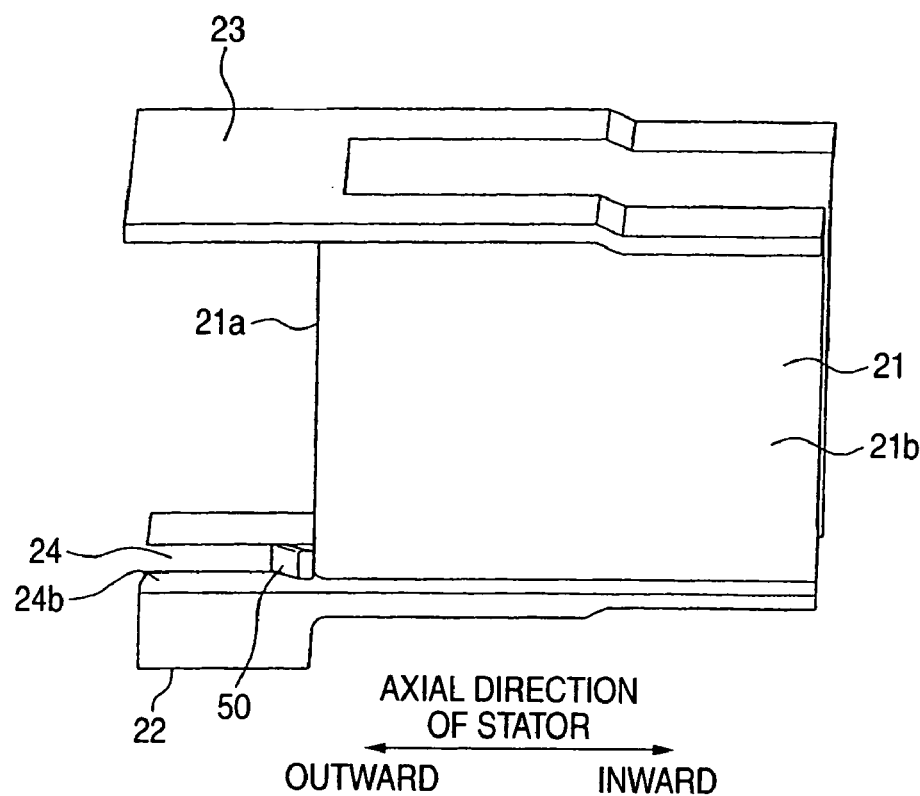
FIG. 8 is a perspective view of a second embodiment of an insulating bobbin according to the invention.
Figure 9:
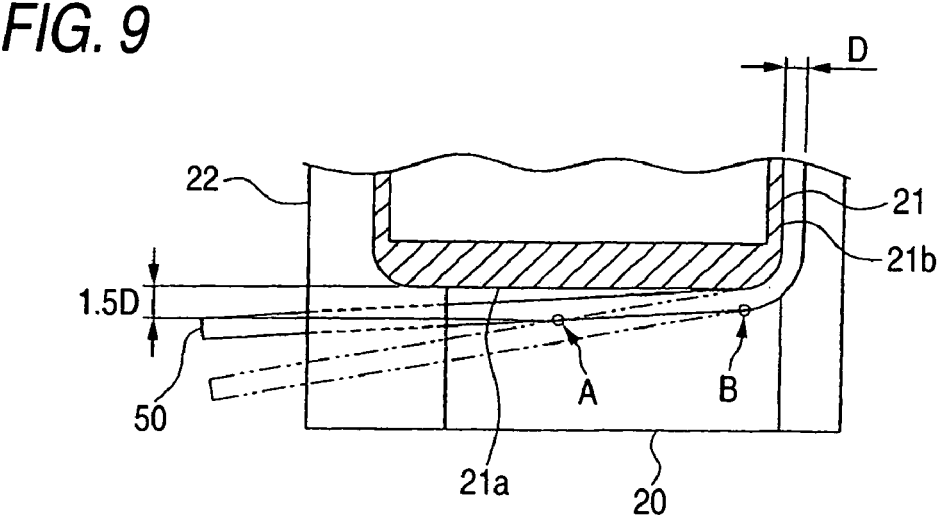
FIG. 9 is a cross-sectional view of the insulating bobbin according to the second embodiment, which corresponds to FIG. 4.

Next, referring to FIGS. 8 and 9, a second embodiment of a stator and an insulating bobbin according t the invention will be described. Note that FIG. 8 is a perspective view showing a half of an insulating bobbin 20, and FIG. 9 is a drawing corresponding to FIG. 4 which illustrates the first embodiment.

A stator 1 and an insulating bobbin 20 according to the second embodiment differ from those of the first embodiment only in that a bottom surface 24*a* of a guide groove 24 in the insulating bobbin 20 is made up of an inclined surface which inclines inwardly in the axial direction of the stator 1 as it extends along the longitudinal direction of the guide groove 24 so as to approach the tooth insulating portion 21. Since the other constructions are identical to those of the first embodiment, like reference numerals are given to like constituent parts, and the description thereof will be omitted.

Namely, the bottom surface 24*a* of the guide groove 24 is neither flush nor parallel with the side 21*a* of the tooth insulating portion 21, and the bottom surface 24*a* of the guide groove at an initiating end (an end farther apart from the tooth insulating portion 21) thereof is positioned more outside in the axial direction of the stator 1 than the bottom surface 24*a* of the guide groove 24 at a terminating end (an end closer to the side 21*b* of the tooth insulating portion 21). In other words, assuming that the side 21*a* of the tooth insulating portion 21 is a reference plane, the bottom surface 24*a* of the guide groove 24 at the initiating end thereof is made higher than the bottom surface 24*a* at the terminating end when measured from the reference plane.

According to the construction, the degree of freedom of direction in which the rectangular wire 50 is introduced is expanded, and as a result, the degree of freedom in designing the insulating bobbin 20 is expanded.

Note that as has been described above, in the event that the bottom surface 24*a* of the guide groove 24 is made up of the inclined surface which inclines inwardly in the axial direction of the stator 1 as it extends along the longitudinal direction of the guide groove 24 so as to approach the tooth insulating portion 21, when winding the rectangular wire 50 along the inner surface of the extending portion 22 for a second layer, the rectangular wire 50 so wound needs to ride over the rectangular wire 50 wound for the first layer. A height over which the rectangular wire 50 needs to ride then becomes a height, resulting when measured from the reference plane (the side 21*a*), of a highest point (namely, a point A in this embodiment) of a line of intersection (also referring to FIG. 2, from point A to point B) between the rectangular wire 50 that is wound along the inner surface of the extending portion 22 for the first layer and the rectangular wire 50 for the second layer.

In the event that the ride-over height is too high, the rectangular wire 50 for the second layer cannot ride over the rectangular wire of the first layer in a smooth fashion, resulting in a cause for a disturbance of winding.

As to the riding over of the first layer rectangular wire by the second layer rectangular wire, it is found out that in case a height from the reference plane (the side 21*a*) at the point A is restricted to a height that is 1.5 times or smaller the thickness D of the rectangular wire 50, the rectangular wire 50 for the second layer can smoothly ride over the rectangular wire 50 of the first layer, causing no disturbance in winding. Then, as shown by solid lines in FIG. 9, it is preferable to set the inclination angle of the bottom surface 24*a* such that the height, resulting when measured from the reference plane (the side 21*a*), of the highest point (point A) of the line of intersection is restricted to the height that is 1.5 times or smaller than the thickness D of the rectangular wire 50.

[Third Embodiment]

Next, referring to FIGS. 10 to 14, a third embodiment of a stator and an insulating bobbin according to the invention will be described below.

Figure 10:
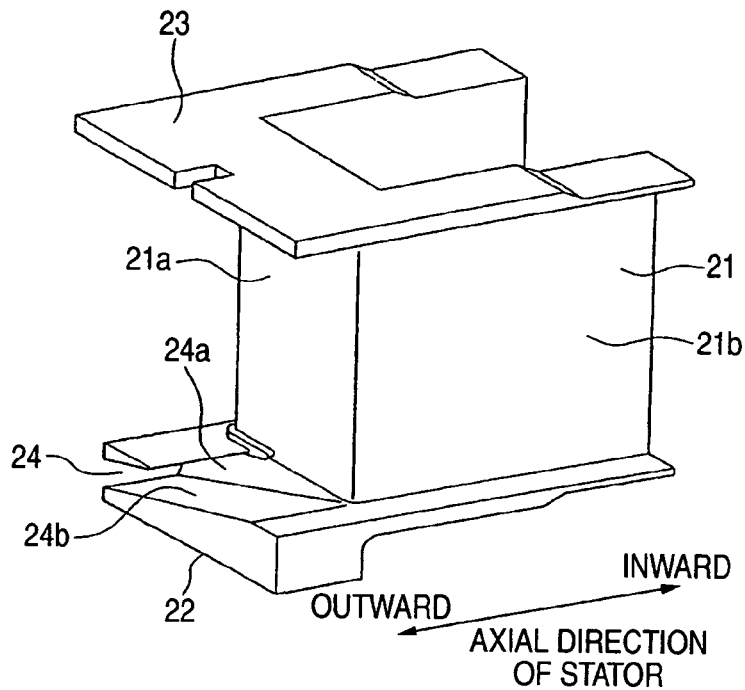
FIG. 10 is a perspective view of a third embodiment of an insulating bobbin according to the invention.
Figure 11:
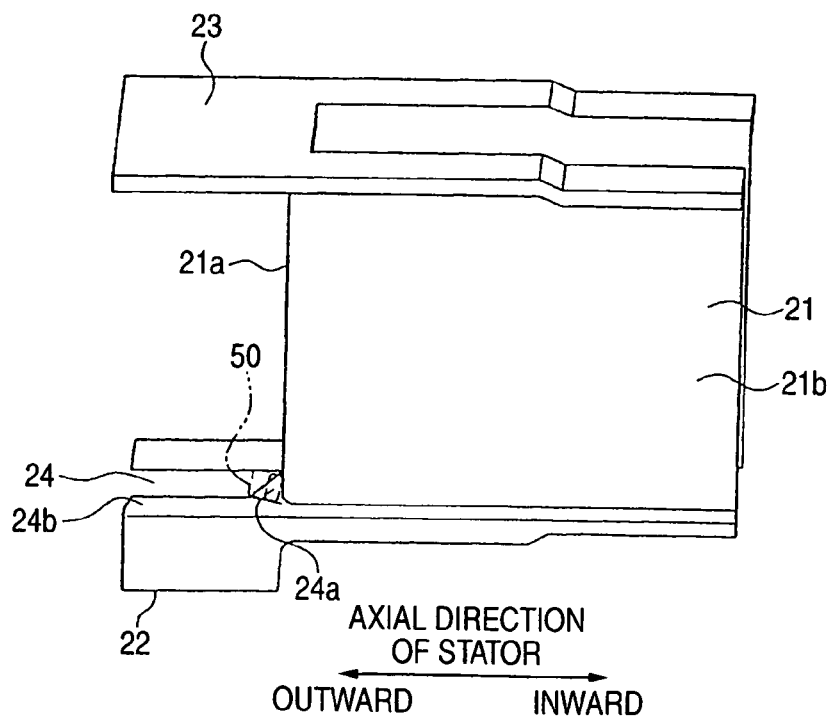
FIG. 11 is a perspective view of the insulating bobbin according to the third embodiment.

As shown in FIGS. 10 and 11, a stator 1 and an insulating bobbin 20 according to the third embodiment differ from those of the first embodiment only in that a bottom surface 24*a* of a guide groove 24 in the a bottom surface 24*a* of a guide groove 24 in the insulating bobbin 20 is made up of an inclined surface which inclines inwardly in the axial direction of the stator 1 as it extends along the longitudinal direction of the guide groove 24 so as to approach the tooth insulating portion 21 and which inclines inwardly in the axial direction of the stator 1 as it extends along a widthwise direction of the guide groove 24 so as to approach the tooth insulating portion 21, and that the bottom surface 24*a* of the guide groove 24 connects continuously to the side 21*a* of the tooth insulating portion 21 without any difference in level being produced therebetween.

Since the other constructions are identical to those of the first embodiment, like reference numerals are given to like constituent parts, and the description thereof will be omitted.

As has been described as to the second embodiment, when the bottom surface 24*a* of the guide groove 24 in the insulating bobbin 20 is made to incline inwardly in the axial direction of the stator 1 as it extends along the longitudinal direction of the guide groove 24 so as to approach the tooth insulating portion 21, it is preferable to restrict the height, resulting when measured from the reference plane (the side 21*a*), of the highest point (point A) of the line of intersection between the rectangular wire 50 that is wound along the inner surface of the extending portion 22 for the first layer and the rectangular wire 50 for the second layer to the height that is 1.5 times or smaller than the thickness D of the rectangular wire 50. However, in case the condition is attempted to be satisfied, as shown in double-dashed lines in FIG. 9, the inclination angle of the bottom surface 24*a* of the guide groove 24 cannot be increased, resulting in restriction of the degree of freedom in designing the insulating bobbin 20.

Then, according to the third aspect of the invention, by causing the bottom surface 24*a* of the guide groove 24 to incline further inwardly in the axial direction of the stator as it extends along the widthwise direction of the guide groove 24 so as to approach the tooth insulating portion 21 (in other words, by causing the height of the bottom surface 24*a* from the reference plane (the side 21*a*) to lower as it extends along the widthwise direction of the guide groove 24 so as to approach the tooth insulating portion 21), the height from the reference plane (the side 21*a*) at the highest point (point A) of the line of intersection can be allowed to be restricted to the height which is equal to or smaller than 1.5 times the thickness D of the rectangular wire 50, even when the inclination angle is increased which inclines inwardly in the axial direction of the stator as it extends along the longitudinal direction of the guide groove 24 so as to approach the tooth insulating portion.

Figure 12:
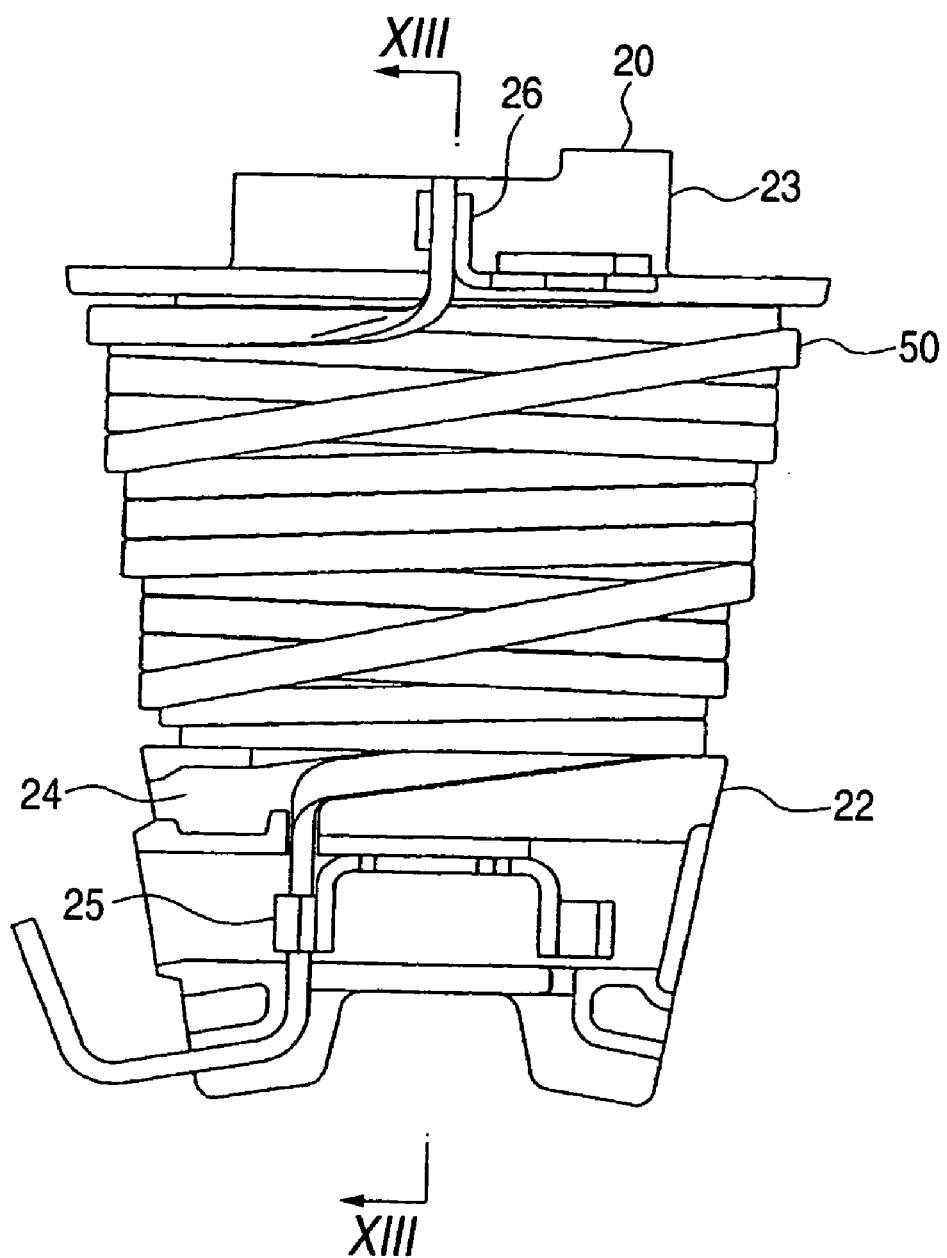
FIG. 12 is a drawing showing a specific example, which is more realistic, of the insulating bobbin according to the third embodiment, which is a front view showing a state in which a rectangular wire is wound around the insulating bobbin.
Figure 13:
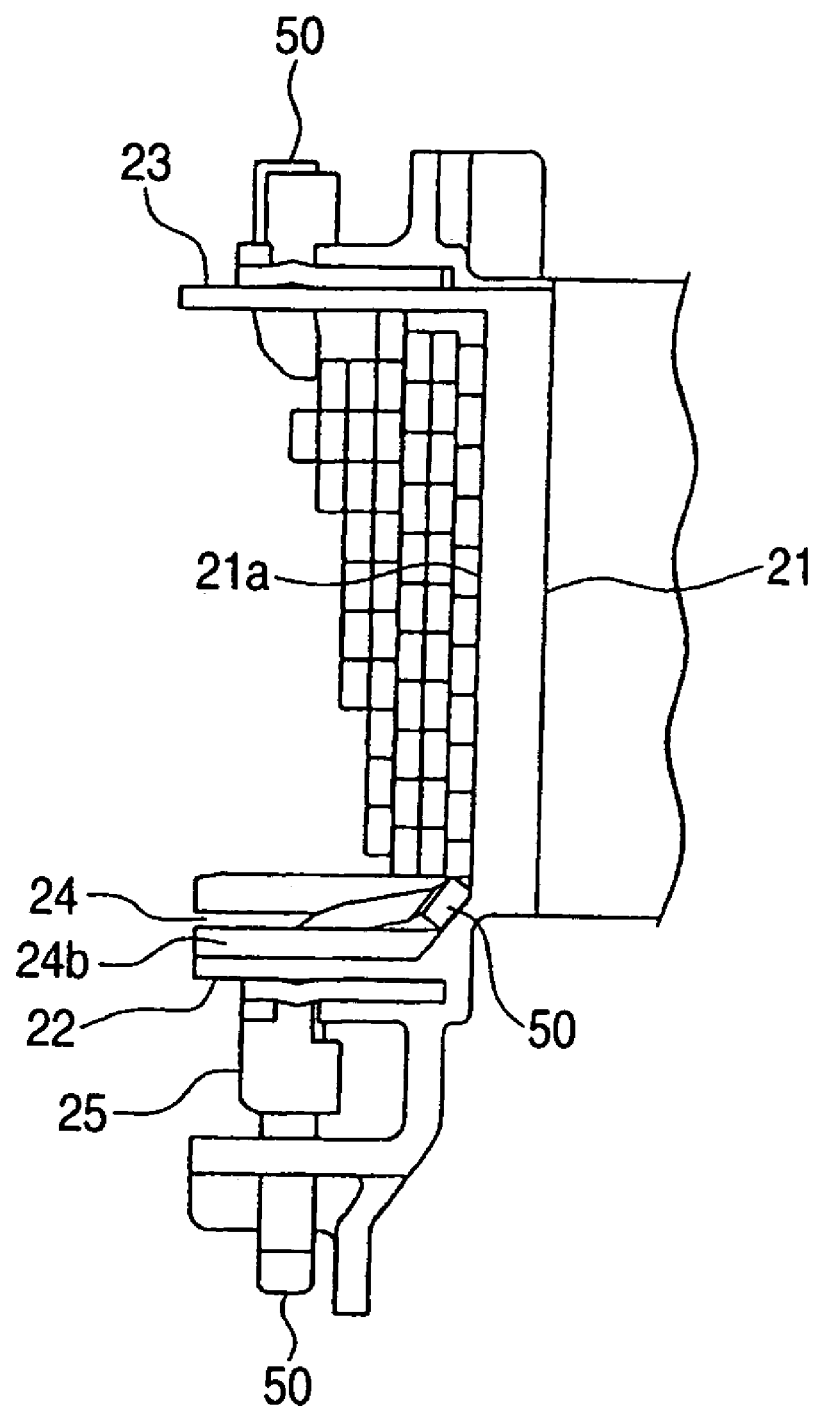
FIG. 13 is a cross-sectional view taken along the line XIII—XIII in FIG. 12.
Figure 14:
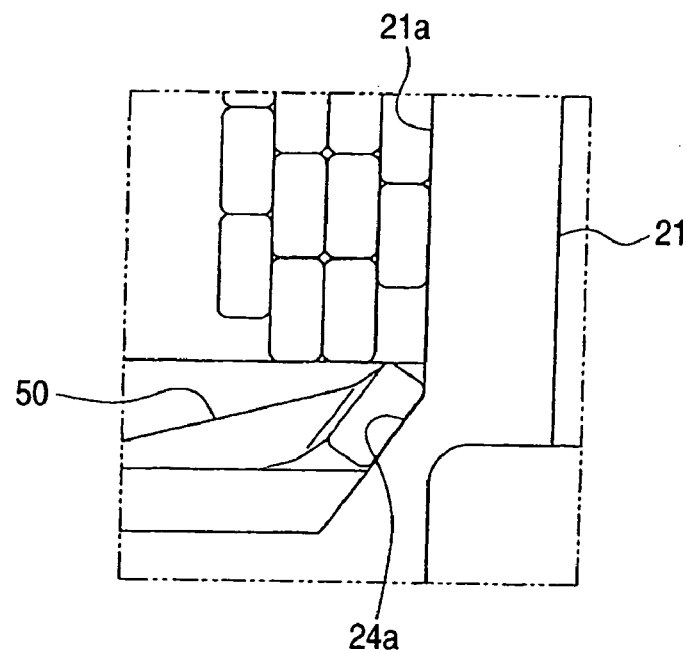
FIG. 14 is an enlarged cross-sectional view showing a main part of FIG. 13.

FIG. 12 is a drawing showing a specific example, which is more realistic, of the insulating bobbin 20 according to the third embodiment, which shows a state in which the winding of the rectangular wire 50 around the insulating bobbin 20 is completed, FIG. 13 is a cross-sectional view taken along the line XIII—XIII in FIG. 12, and FIG. 14 is an enlarged cross-sectional view showing a main part of FIG. 13. In this specific example, after the rectangular wire 50 has been wound around the insulating bobbin 20, the introducing portion (the portion which is inserted into the guide groove 24) of the rectangular wire 50 is bent to the outside of the extending portion 22 so as to be locked to a support portion of the insulating bobbin 20, and the terminating end portion of the rectangular wire 50 is bent to the outside of the extending portion 23 so as to be locked to a support portion 26 of the insulating bobbin 20.

Figure 15:
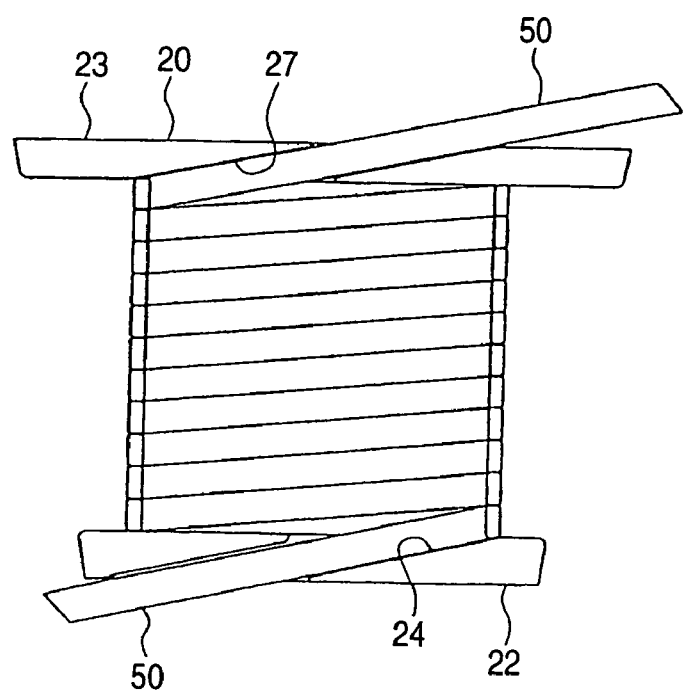
FIG. 15 is a front view of an insulating bobbin according to another embodiment.
Figure 16:
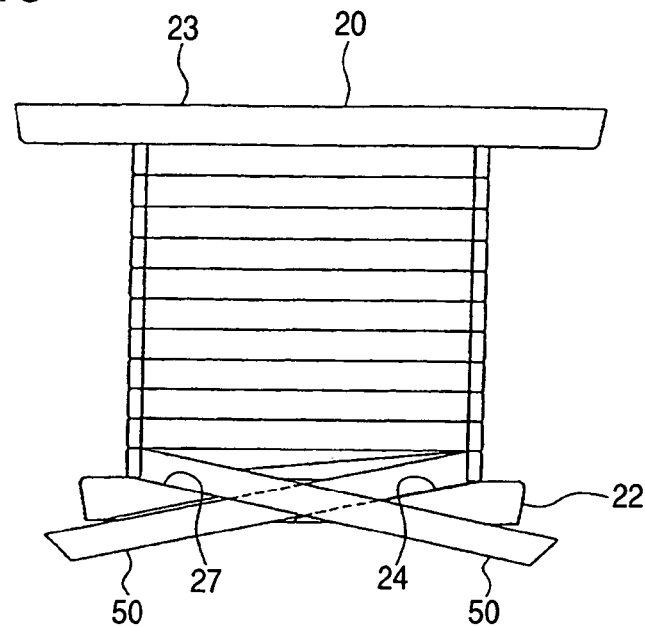
FIG. 16 is a front view of an insulating bobbin according to a further embodiment.
Figure 17:
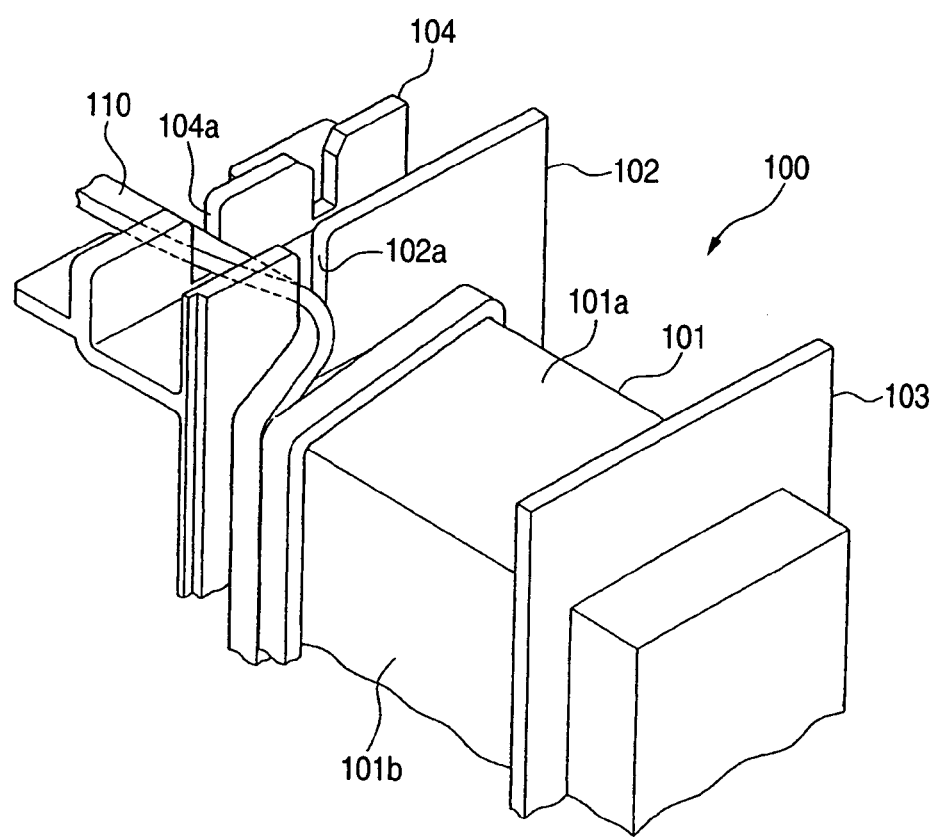
FIG. 17 is a perspective view showing a portion where a rectangular wire is introduced and a start-winding portion of a conventional insulating bobbin.
Figure 18:
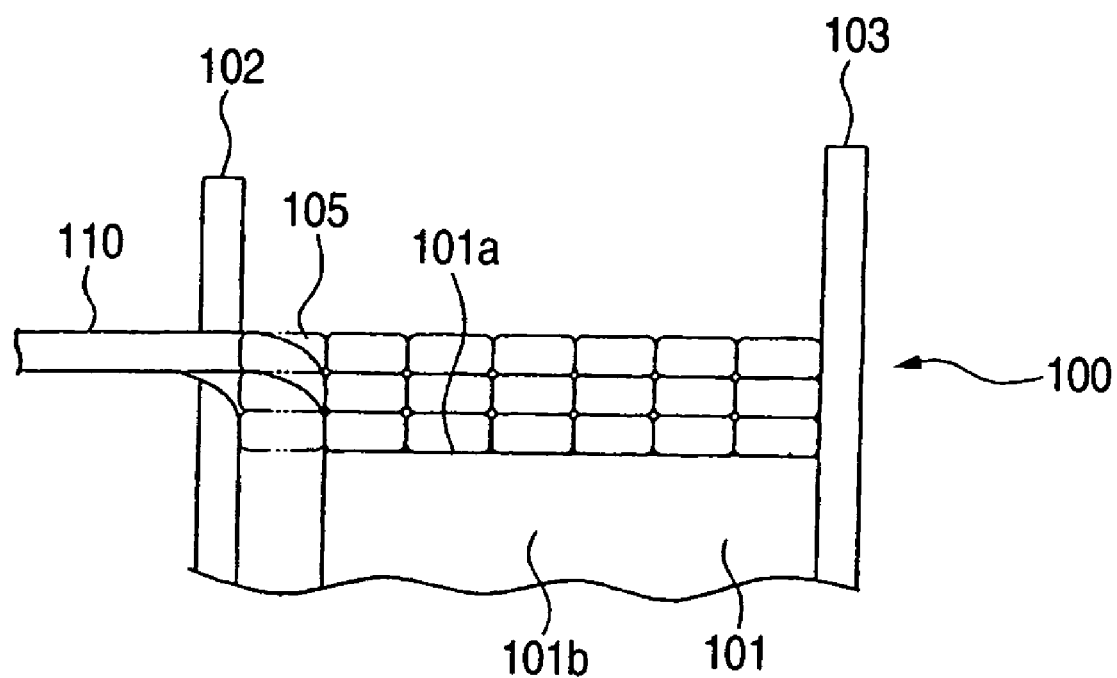
FIG. 18 is a side view of the conventional insulating bobbin.

Note that, as shown in FIGS. 15 and 16, a guide groove 27 may be provided on the insulating bobbin 20 on a side where the end-winding end of the rectangular portion 50 is located for guiding the rectangular wire 50 to the outside of the insulating bobbin 20. FIG. 15 shows an example where the guide groove 24 located at the start-winding end of the rectangular wire 50 is provided in the extending portion 22, whereas the guide groove 27 at the end-winding end of the rectangular wire 50 is provided in the extending portion 23, and FIG. 16 shows an example where both the guide groove 24 located at the start-winding end and the guide groove 27 at the end-winding end are provided in the extending portion 22.

Figure 19:
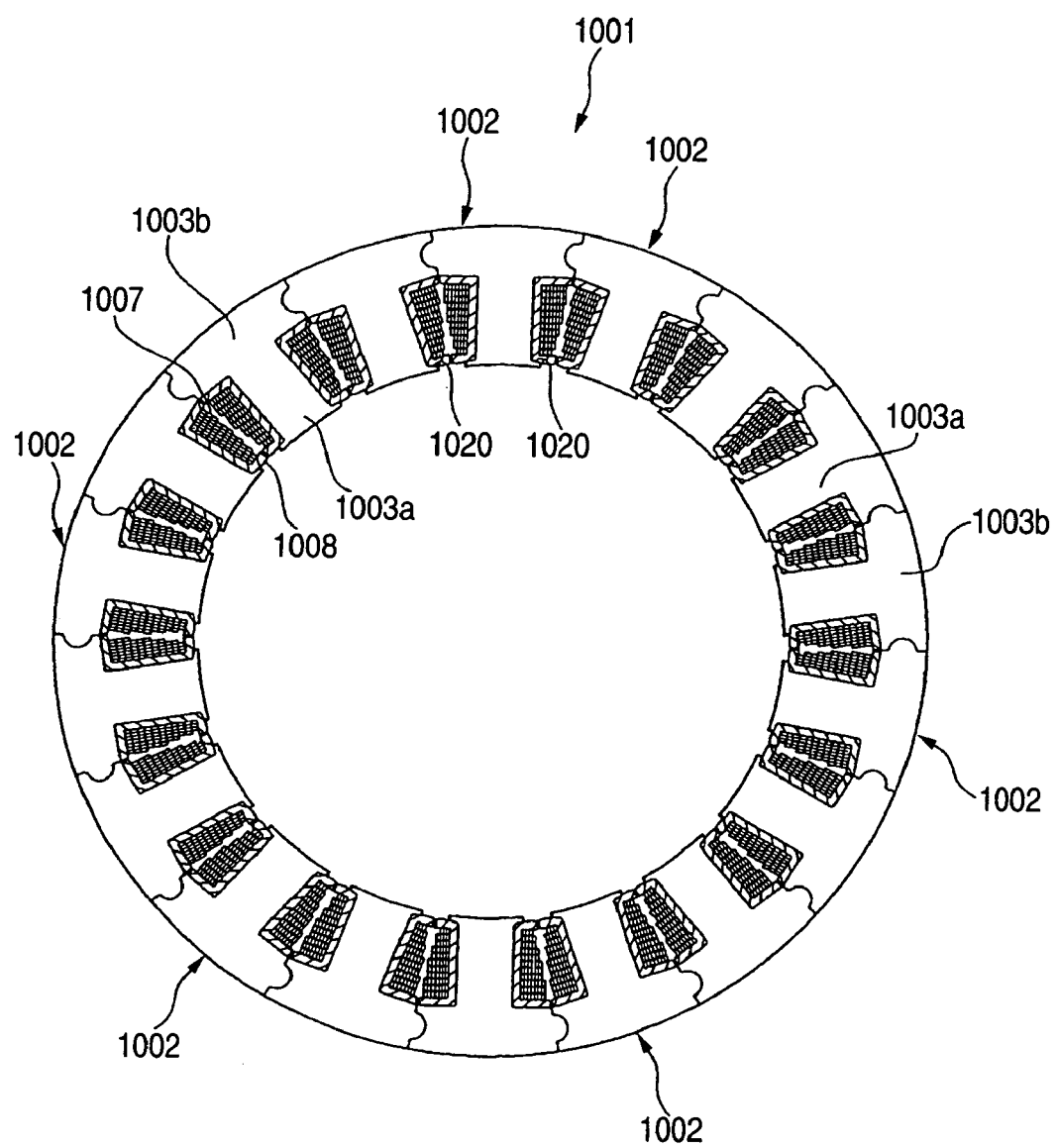
FIG. 19 is a cross-sectional view schematically illustrating a stator according to an embodiment of the invention.

A stator and a method for fabricating the same according to an embodiment of the invention will be described below by reference to the accompanying drawings FIG. 19 is a schematic view showing the construction of a stator according to an embodiment of the invention.

Hereinafter, the stator according to the embodiment of the invention will be described by reference to the drawings. FIG. 19 is a perspective view of a stator core according to the embodiment of the invention. As is shown in the drawing, the stator core 1001 is formed into an annular shape by arranging a plurality of stator pieces 1002 in a circumferential direction. Each stator piece 1002 has a plurality of magnetic pole teeth 1003*a* which are formed so as to protrude radially inwardly of the stator core 1001 and a yoke portion 1003*b* which is formed so as to extend in the circumferential direction of the stator core 1001.

A locking portion 1020 protruding circumferentially outwardly is provided on the magnetic pole tooth 1003*a* of the stator piece 1002 at an end portion on an inner circumferential side thereof so as to prevent a stator winding 7, which will be described later on, from falling off the tooth in a radially inward direction. On the other hand, an engaging concave portion 1004 and an engaging convex portion 1005 are provided on circumferential ends of the yoke portion 1003*b* of the stator piece 1002, whereby the yoke portions 1003*b*, 1003*b* of adjacent stator pieces 1002 can be positioned and held so positioned by bringing the engaging concave portions 1004 into engagement with the engaging convex portions 1005 of the yoke portions 1003*b*, respectively.

The stator piece 1002 is formed by stacking electromagnetic steel plates such as a silicone steel plates having a directional property, and for example, in the magnetic pole tooth 1003*a*, an easily magnetizable direction is set in the radial direction of the stator core 1001, and in the yoke portion 1003*b*, the easily magnetizable direction is set in the circumferential direction of the stator core 1001.

In addition, a stator winding 1007 made up of a conductive wire of copper or the like is wound around sides of the magnetic pole teeth 1003*a* which are arranged in the annular shape, respectively. In this embodiment, so-called rectangular wire 1006 having a substantially rectangular cross section is wound around each tooth 1003*a* by concentrated winding so as to form the stator winding 1007. This will be described later on.

A tubular insulating bobbin 8 is disposed between the stator winding 1007 and each tooth 1003*a*. In this embodiment, a pair of bobbin pieces 1008*a*, 1008*b* are combined into a tubular shape as an insulating bobbin 1008.

Figure 24:
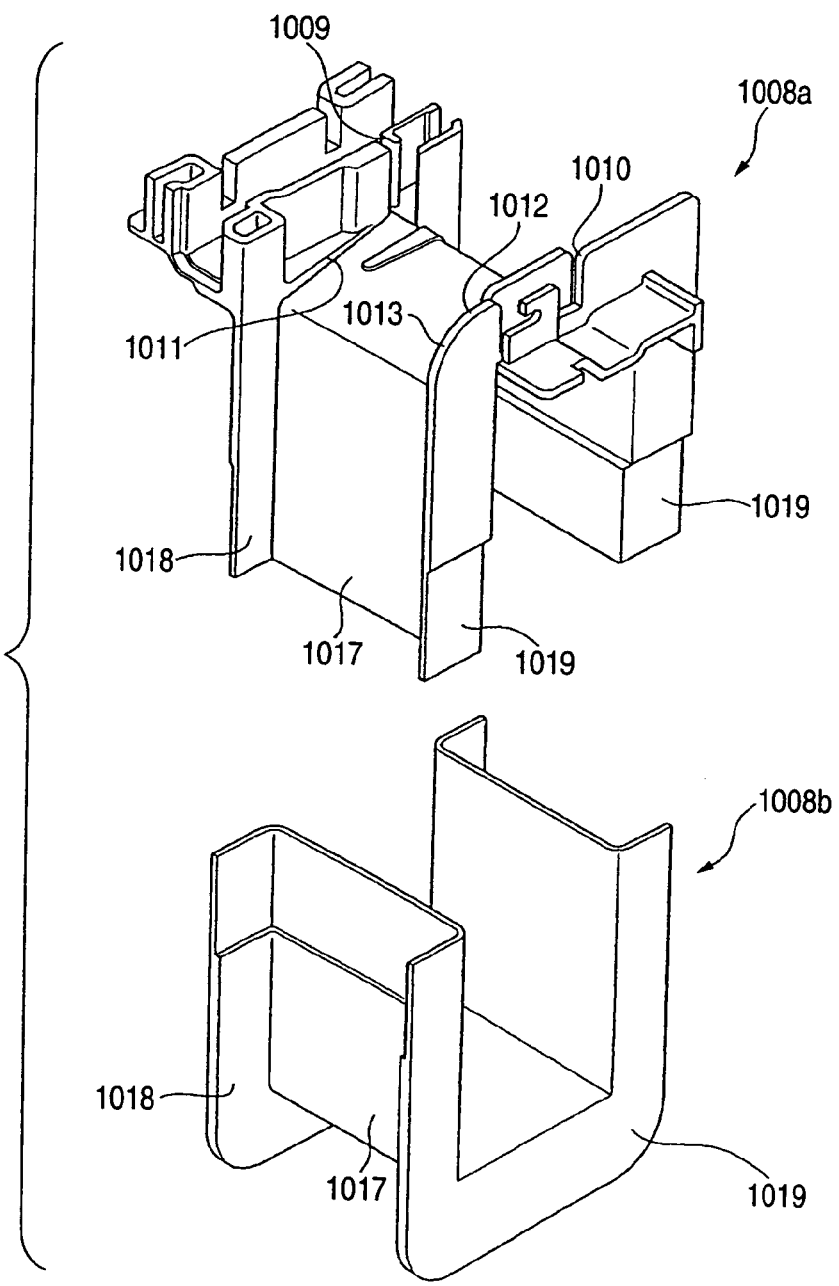
FIG. 24 is a perspective view showing insulating bobbin pieces which constitute an insulating bobbin.

FIG. 24 is a perspective view showing the insulating bobbin piece 1008*a* which constitutes the insulating bobbin 1008. As shown in the drawing, the insulating bobbin piece 1008*a* has a main body portion 1017 that is formed into a shape having a substantially U-shaped cross section so as to cover the sides of the magnetic pole tooth 1003*a*, a tooth-side extending portion 1018 and a yoke-side extending portion 1019, both of which extend from respective ends of the main body portion 1017. The tooth-side extending portion 1018 is a location which extends along the locking portion 1020 of the magnetic pole tooth 1003*a*, and the yoke-side extending portion 1019 is a location which extends along an inner circumferential surface of the yoke portion 1003*b*.

Additionally, an inner circumferential side holding portion 1009 and an outer circumferential side holding portion 1010 are formed, respectively, on a radially inner circumferential side and a radially outer circumferential side of the stator core 1001 for holding end portions of the stator winding 1007. In this embodiment, a start-winding portion of the stator winding 1007 is held in the inner circumferential side holding portion 1009, whereas an end-winding portion of the stator winding 1007 is held in the outer circumferential side holding portion 1010, respectively. In addition, a guide portion 1011 is formed on the tooth-side extending portion 1018 in such a manner as to incline at a predetermined angle from the inner circumferential side holding portion 1009, so that the rectangular wire 1006 can be wound while being guided by the guide portion 1011.

Additionally, a chamfered portion 1012 is formed on a corner portion of the yoke side extending portion 1019 of the insulating bobbin piece 1008*a*, and a tapered portion 1013 is provided on an inside of the chamfered portion 1012, so that the rectangular wire can be wound while being guided by the tapered portion 1013. This will be described later on.

Note that the other bobbin piece 1008*b* which constitutes the insulating bobbin 1008 is constructed such that a main body portion 1017 thereof is formed into a substantially symmetrical shape to that of the insulating bobbin piece 1008*a*, as shown in FIG. 24, except that holding structures such as the inner circumferential side holding portion 1009 and the outer circumferential side holding portion 1010 for holding the end portions of the stator winding 1007 are omitted from a tooth-side extending portion 1018 and a yoke-side extending portion 1019 thereof.

The pair of insulating bobbin pieces 1008*a*, 1008*b* which are formed as has been described above are made to face each other and are then mounted on each magnetic pole tooth 1003*a* in such a manner as to fit thereon from both sides in an axial direction of the stator core 1001, whereby the sides of the magnetic pole tooth 1003*a* are covered by the main body portions 1017 of the insulating bobbin pieces 1008*a*, 1008*b*, an inner circumferential surface of the yoke portion 1003b is covered by the yoke-side extending portions 1019 of the insulating bobbin pieces 1008a, 1008b, and the locking portion 1020 of the magnetic pole tooth 1003a is covered by the tooth-side extending portions 1018 of the insulating bobbin pieces 1008a, 1008b, respectively.

Then, in this state, the rectangular wire 1006 is wound around the sides of each magnetic pole tooth 1003a by concentrated winding so as to form the stator winding 1007. FIGS. 20A to 20E are explanatory drawings illustrating a process of forming the stator winding 1007 onto the stator piece 1002 shown in FIG. 19.

Figure 20A:
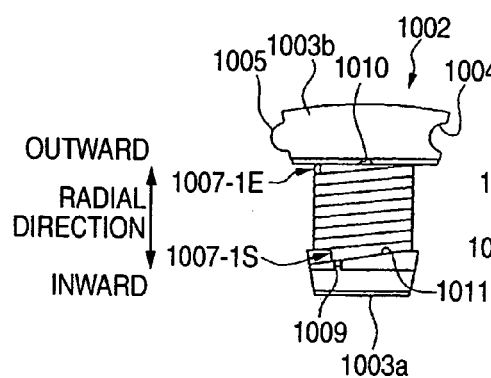
FIGS. 20A–20E are explanatory drawings illustrating a process of forming a stator winding on a stator piece shown in FIG. 19.

Firstly, as shown in FIG. 20A, a start-winding portion 1007-1S of a stator winding 1007-1 for a first layer is held in the inner circumferential side holding portion 1009 of the insulating bobbin 1008. Then, by winding the stator winding 1007 around along the guide portion loll of the insulating guide bobbin 1008 in an aligned fashion from a radially inward end to a radially outward end of the insulating bobbin 1008 sequentially, the stator winding 1007-1 is formed. In this embodiment, when the stator winding 1007-1 which is wound around along the guide portion 1011 extends from one edge side (a left side in FIG. 20A) to the other edge side (a right side in FIG. 20A) of the insulating bobbin 1008, the stator winding 1007-1 is wound in such a manner as to deviate radially outwardly by a distance equal to the width of the rectangular wire 1006, whereby the end-winding portion 1007-1E can be positioned in a space equal to the width of the rectangular wire 1006 secured on the one edge side (the left side in FIG. 20A) while the stator winding 1007-1 for the first layer is being brought into abutment with the yoke-side extending portion 1019 of the insulating bobbin 1008 on the other edge side (the right side in FIG. 20A) thereof.

Figure 20B:
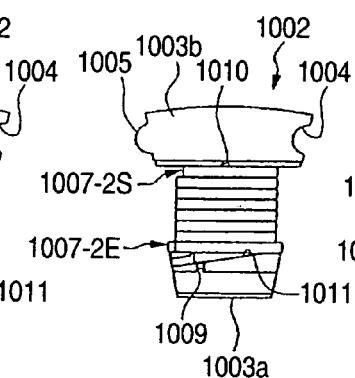

Next, as shown in FIG. 20B, a start-winding portion of a stator winding 1007-2 is wound from the same position as the end-winding portion 1007-1E of the first layer along the yoke-side extending portion 1019 and is further wound from the radially outward end to the radially inward end of the insulating bobbin 1008 in a linearly aligned fashion. Then, the stator winding 1007-2 is wound around the insulating bobbin 1008 in such a manner as to become substantially horizontal relative to an upper end of the guide portion 1011, and an end-winding portion 1007-2E of the stator winding 1007-2 is positioned on one edge side (a left side in FIG. 20B) of the insulating bobbin 1008.

Figure 20C:
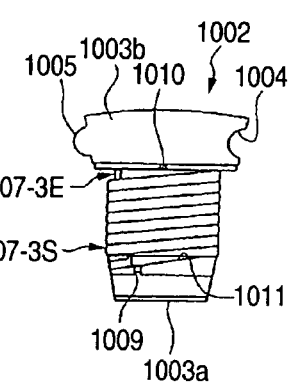

Next, as shown in FIG. 20C, when extending from the one edge side to the other edge side of the insulating bobbin 1008, a stator winding 1007-3 for a third layer is wound in such a manner as to deviate radially outwardly by the distance equal to the width of the rectangular wire 1006 in a similar way to that shown in FIG. 20A, whereby an end-winding portion 1007-3E of the stator winding 1007-3 for the third layer is positioned in a space equal to the width of the rectangular wire 1006 secured on the one edge side of the insulating bobbin 1008 while the stator winding 1007-3 is being brought into abutment with the yoke-side extending portion 1019 of the insulating bobbin 1008 on the other edge side thereof.

Figure 20D:
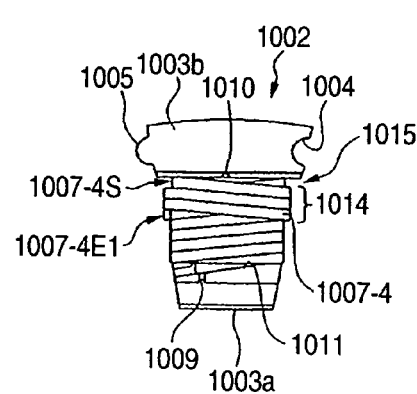

Then, as shown in FIG. 20D, a stator winding 1007-4 for a fourth layer is formed. The stator winding 1007-4 is caused to diagonally extend from a start-winding portion 1007-4S located on the one edge side of the insulating bobbin 1008 toward the other edge side thereof to the following line in such a manner as to straddle a space equivalent to one line so as to provide a recessed portion and is then wound around a plurality of turns (three times in this case) to thereby form a diagonal extending portion 1014, and an end-winding portion 1007-4E1 is positioned on the one edge side of the insulating bobbin 1008 where the start-winding portion 1007-4S is positioned.

Figure 20E:
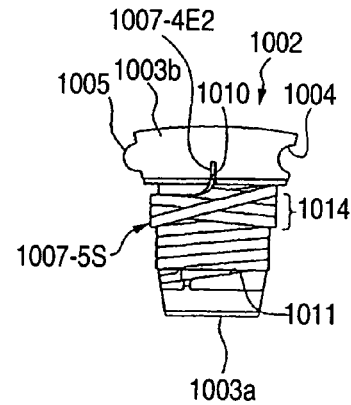

Then, as shown in FIG. 20E, a start-winding portion 1007-5S of a stator winding 1007-5 for a fifth layer is wound diagonally across the diagonal extending portion 1014 in such a manner as to intersect diagonally therewith, and the stator winding 1007-5 for the fifty layer is wound into the recessed portion 1015, whereby the stator winding 1007-5 is made to fall in the fourth layer. Then, this stator winding 1007-4 is wound from the recessed portion 1015 along the outer circumferential side holding portion 1010, so that an end-winding portion 1007-4E2 is held in the outer circumferential side holding portion 1010.

Figure 27A:
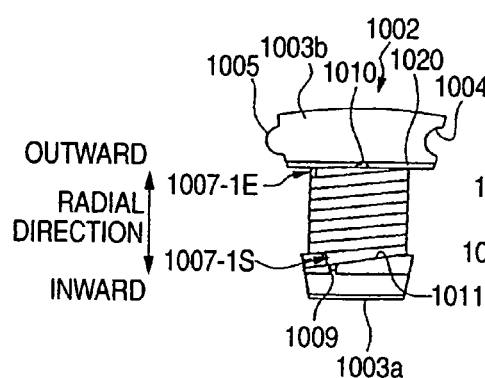
FIGS. 27A–27E are process drawings illustrating a process of winding a rectangular wire to a stator piece of a comparison example.
Figure 27B:
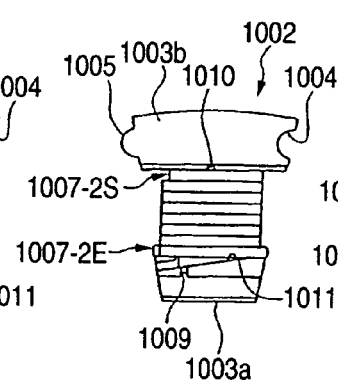
Figure 27C:
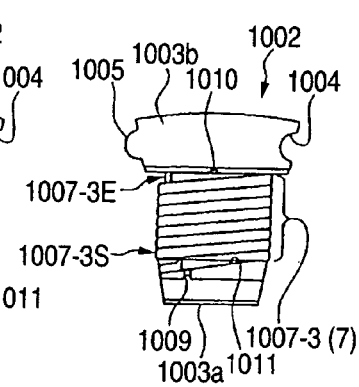
Figure 27D:
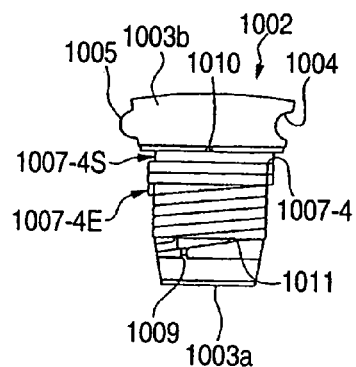
Figure 27E:
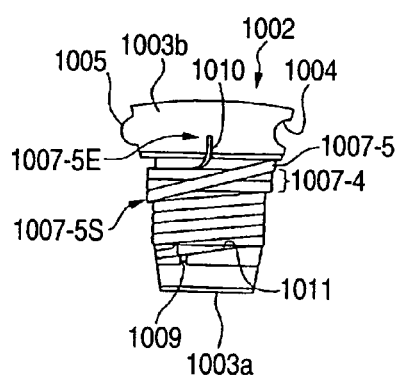
Figure 28:
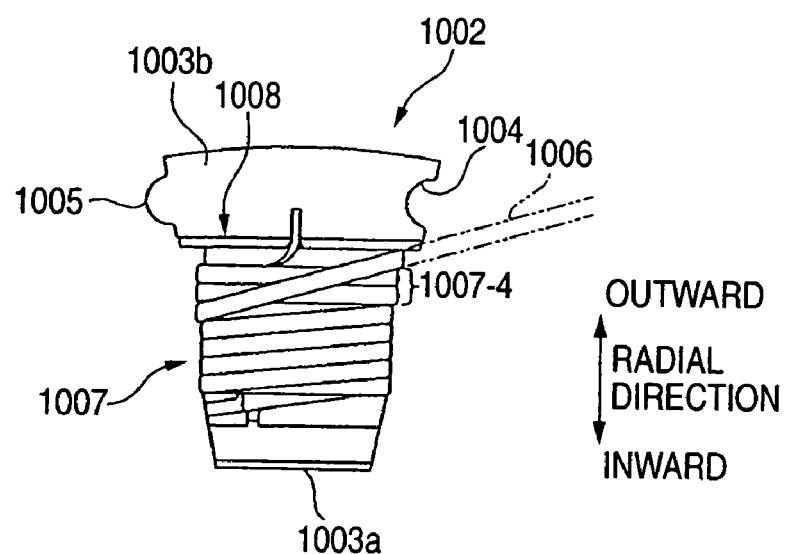
FIG. 28 is a plan view of a stator on which the winding process shown in FIG. 27 is implemented.

According to the construction, the widthwise movement of the stator winding (1007-5S to 1007-4E) of the outermost layer is restricted, and hence the desired shape can be maintained. This will be described by reference to FIGS. 27, 28. FIG. 27 shows a process of winding a rectangular wire around a stator piece of a comparison example. FIG. 28 is a plan view of the stator piece on which the winding process shown in FIG. 27 has been implemented. In FIGS. 27A to 27C, the rectangular wire is wound sequentially in an aligned fashion from a radially inward end to a radially outward end or from the radially outward end to the radially inward end as was so done in FIGS. 20A to 20C. Then, as shown in FIGS. 27D, 27E, the rectangular wire is wound sequently from the radially outward end to the radially inward end, and when a start-winding portion 1007-5S of a fifth layer is caused to extend on a stator winding 1007-4 located radially outwardly so as to be wound therearound, the stator winding 1007-5 so wound protrudes from the surrounding stator winding 1007-4. Since there is provided no restriction to a widthwise movement of the stator winding 1007-5 which so protrudes, the stator winding 1007-5 is permitted to move in the widthwise direction, and hence there is caused a risk that the overall shape of the stator winding 1007 (1007-1 to 1007-5) cannot be held to the desired shape.

In contrast, with the stator winding 1007 according to the embodiment, the rectangular wire (1007-5S to 1007-4E2) of the outermost layer is made to intersect diagonally with the diagonal extending portion 1014 so as to be wound into the recessed portion 1015, whereby the rectangular wire (1007-5S to 1007-4E2) of the outermost layer can be accommodated in the recessed portion 1015 so as to restrict the widthwise movement thereof. Furthermore, since the portion (1007-5S to 1007-4E2) of the rectangular wire that is wound into the recessed portion 1015 and the portions (1007-4) thereof which constitute the diagonal extending portion 1014 are wound around in such a manner as to intersect with each other, the widthwise movement of the respective portions can be restricted by each other, and consequently, the shape of the stator winding 1007 can be maintained to the desired shape. Furthermore, by winding the rectangular wire 1006 along the insulating bobbin 1008 mounted on the magnetic pole tooth 1003a in the concentratedly aligned fashion, the space factor can be increased. In addition, since there is no need to apply any special treatment or processing to the rectangular wire 1006, the costs, the number of processing steps and processing time can be suppressed to lower levels, respectively.

Figures 21A, 21B, 21C:
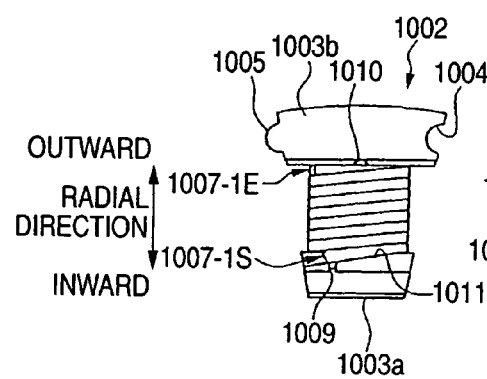
FIGS. 21A–21F are explanatory drawings illustrating another process of forming a stator on the stator piece shown in FIG. 19.
Figures 21D, 21E, 21F:
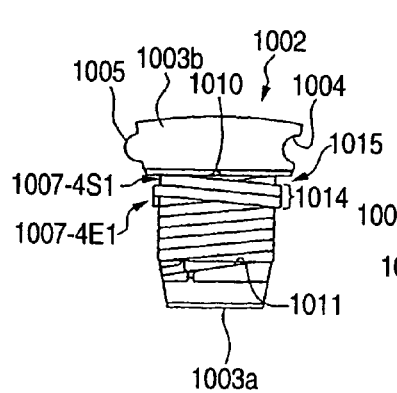

FIG. 21 illustrates another process of forming a stator winding on the stator piece shown in FIG. 19. In FIGS. 21A to 21C, the rectangular wire is wound sequentially in an aligned fashion from the radially inward end to the radially outward end or from the radially outward end to the radially inward end as was so done in FIGS. 20A to 20C. Then, as shown in FIG. 21D, the rectangular wire is caused to extend from a start-winding portion 1007-4S1 on one edge side of the insulating bobbin 1008 to the other edge side thereof in such a manner as to straddle a space equivalent to one line so as to form a recessed portion 1015 and is then wound diagonally around the insulating bobbin 1008 twice to thereby form a diagonal extending portion 1014. Following this, as shown in FIG. 21E, the rectangular wire is wound across diagonally the diagonal extending portion 1014 in such a manner as to diagonally intersect therewith and is wound into the recessed portion 1015. Furthermore, as shown in FIG. 21F, the rectangular wire is wound further from the one edge side of the insulating bobbin 1008 along the outer circumferential side holding portion 1010, and thereafter, an end-winding portion 1007-5E is held in the outer circumferential holding portion 1010. According to the construction, since the diagonal extending portion 1014 and the portion (1007-5S to 1007-4E2) which is made to intersect diagonally with the diagonal extending portion 1014 so as to be wound into the recessed portion 1015 can be pressed down by the stator winding 1007-5 that is wound along the outer circumferential side holding portion 1010, the shape of the stator winding 1007 can be maintained more rigidly. In addition, as shown in FIG. 21F, the stator winding 1007-5 of the outermost layer can be held at the same level as that of another stator winding 1007-4 on the one edge side (a left side in FIG. 21F) of the insulating bobbin 1008, whereby the widthwise movement thereof is restricted.

Figure 22:
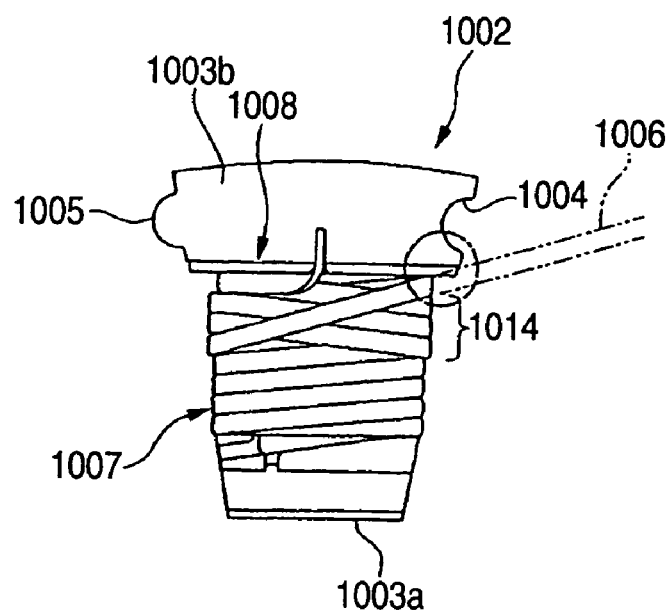
FIG. 22 is a plan view of a stator piece on which the winding process shown in FIG. 20 is implemented.
Figure 23:
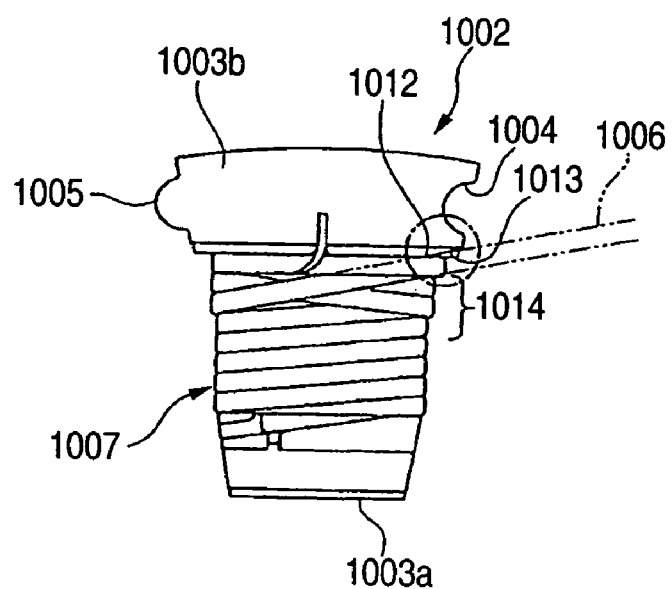
FIG. 23 is a partial explanatory drawing of a stator on which the winding process shown in FIG. 21 is implemented.

In addition, since the rectangular wire 1006 that is wound into the recessed portion 1015 can be guided by the chamfered portion 1012 formed on the corner portion of the bobbin 1008 and the tapered portion 1013 provided on the inside of the chamfered portion 1012, the winding work can be implemented more smoothly. This will be described by reference to FIGS. 22, 23 and 28. FIGS. 22, 23 and 28 are plan views, respectively, of the stator pieces 1002 on which the winding processes shown in FIGS. 20, 21, 27 have been implemented. As shown in these drawings, in a case where the diagonal extending portion 1014 is formed with the recessed portion being provided (in the case of FIGS. 20, 21), when compared with a case where no recessed portion 1015 is provided (in the case of FIG. 28), while the inclination angle of the rectangular wire 1006 wound around the outermost layer is increased, the winding work can be performed more smoothly by allowing the rectangular wire 1006 to be guided by the tapered portion 1013 provided on the chamfered portion 1012 of the insulating bobbin 1008. Furthermore, the insulating bobbin 1008 can be attempted to be made lighter in weight and lower in costs by forming the chamfered portion 1012.

Figure 25:
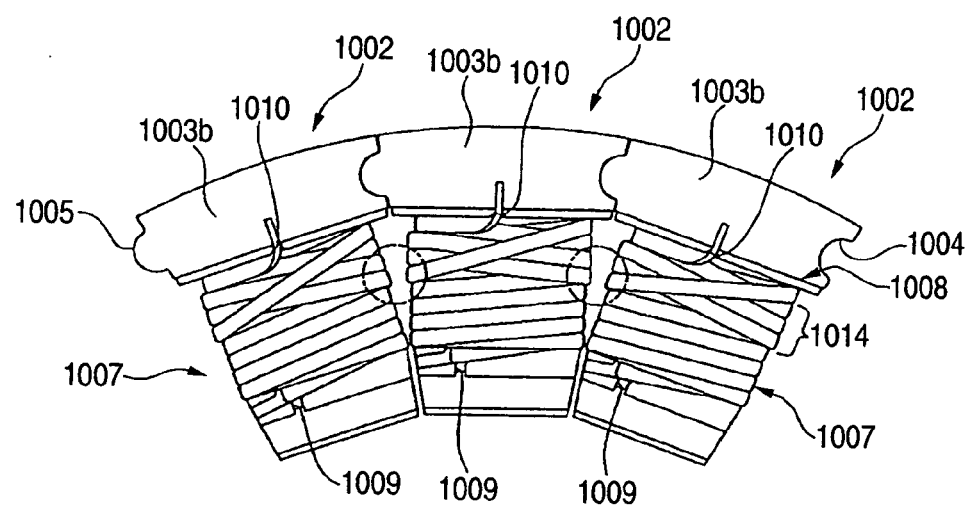
FIG. 25 is a plan view showing a state in which the stators shown in FIG. 23 are assembled together.
Figure 26:
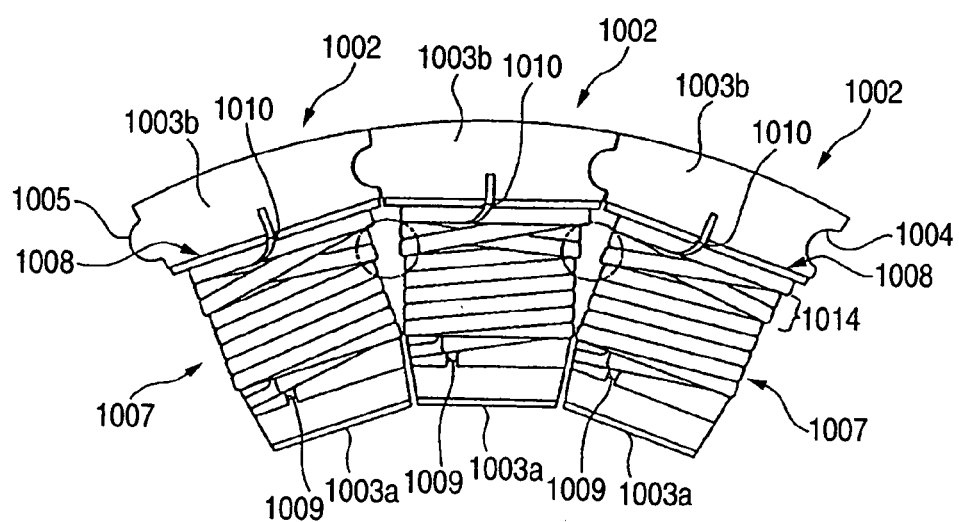
FIG. 26 is a plan view showing a state in which the stators shown in FIG. 24 are assembled together.
Figure 29:
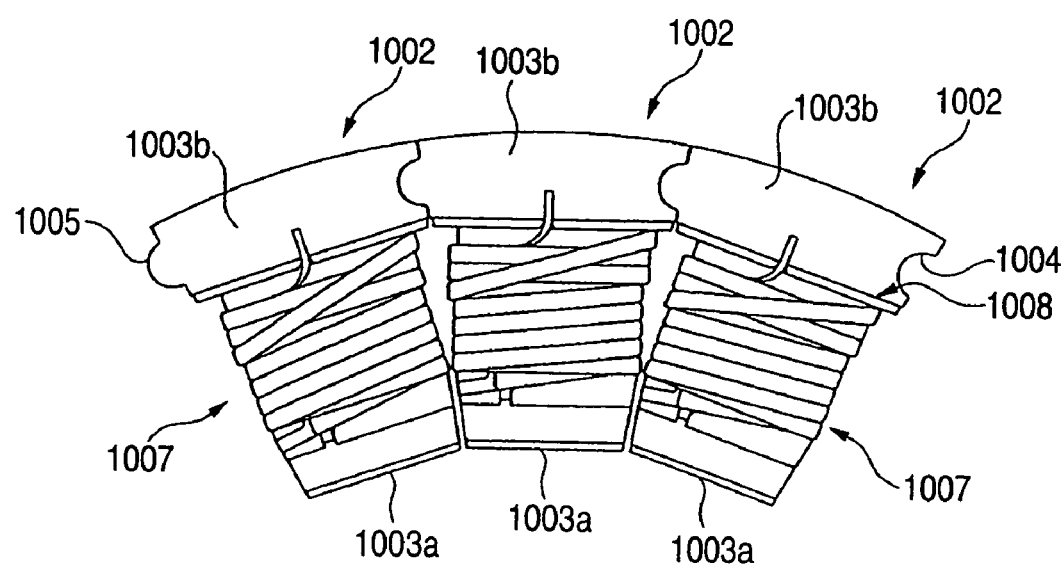
FIG. 29 is a plan view illustrating a state where the stators shown in FIG. 28 are assembled together.

FIGS. 25, 26, 29 are plan views showing, respectively, states where the stator pieces 1002 shown in FIGS. 22, 23, 28 are assembled together. As shown in these drawings, being different from the stator pieces 1002 (FIG. 29) of the comparison example, the stator pieces 1002 (FIGS. 22, 23) according to the embodiment can be assembled together while maintaining the stator winding 1007 in the desired shape, and the reliability is increased. In addition, the stator pieces 1002 shown in FIG. 26 is preferred to the stator pieces 1002 shown in FIG. 25 in that a wider gap can be secured between the stator windings 1007 of the stator pieces 1002.

Note that the contents of the invention are, of course, not limited to the embodiment that has been described heretofore. For example, as has been described above, while it is preferable to form the tapered portion 1013 and the chamfered portion 1012 on the insulating bobbin 1008, the shape of the bobbin 1008 is not limited thereto.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

According to the first aspect of the invention, since the rectangular wire can be inserted diagonally from an outside of the extending portion of the insulating bobbin, the rectangular wire can be smoothly wound around the tooth insulating portion on a first turn thereof without edgewise bending the rectangular wire, and winding work using a simple winding machine is made possible. In addition, since the twisting or forcible bending of the rectangular wire at the portion where the rectangular wire is introduced into the tooth insulating portion 21 can be prevented, no damage is given to an insulating surface that is formed on the surface of the rectangular wire.

According to the second aspect of the invention, since there is no risk that the start-winding portion of the first layer is expanded due to curving or bending, the production of a thick winding can be prevented which would otherwise be caused in the event that the rectangular wire for the second layer comes to interfere with the start-winding portion of the first layer when the rectangular wire for the second layer is started to be wound around the tooth insulating portion.

According to the third aspect of the invention, since the degree of freedom of direction in which the rectangular wire is introduced is expanded, the degree of freedom in designing the insulating bobbin is increased.

According to the fourth aspect of the invention, since the degree of freedom of direction in which the rectangular wire is introduced is expanded further, the degree of freedom in designing the insulating bobbin is increased further.

According to the fifth aspect of the invention, when the first turn of the rectangular wire is wound around the tooth insulating portion, the rectangular wire can be wound therearound closely to the inner side of the extending portion without producing no gap between the wire and the inner side, thereby making it possible to increase the space factor.

According to the sixth aspect of the invention, the rectangular wire of the second layer can ride over the rectangular wire of the first layer in a smooth fashion, thereby making it possible to prevent the occurrence of a disturbance in winding.

According to the seventh aspect of the invention, there can be obtained the stator which can provide the extremely high space factor of rectangular wire.

According to the eighth aspect of the invention, since the space factor can be increased and the widthwise movement of the rectangular wire wound around the outermost layer can be restricted by winding the rectangular wire in an aligned fashion, the rectangular wire can be maintained in the desired shape, thereby making it possible to increase the reliability of the stator so fabricated.

According to the ninth aspect of the invention, the winding work can be implemented more smoothly, and the insulating bobbin can be attempted to be made lighter in weight and lower in costs.

According to the tenth aspect of the invention, the space factor can be increased, and the rectangular wire wound can be maintained in the desired shape, thereby making it possible to enhance the reliability of the stator so fabricated.

What is claimed is:

1. An insulating bobbin mounted on a tooth extending from an annular yoke of a stator with a rectangular wire being around the insulating bobbin, comprising:
   a tooth insulating portion insulating the tooth of the stator and the rectangular wire; and
   an extending portion extending from an end portion of the tooth insulating portion along an inner surface of the yoke,
   wherein a guide groove guiding the rectangular wire diagonally relative to a circumferential direction of the tooth insulating portion from an outside of the extending portion is provided in a side of the extending portion on one of axial sides of the stator,
   wherein an intersection point between an inner side of the extending portion and an outer side of the guide groove is positioned outwardly of a side of the tooth insulating portion where the rectangular wire is bent for the first time by a distance equal to or larger than a thickness of the rectangular wire.

2. A stator, comprising:
   an insulating bobbin mounted on a tooth extending from an annular yoke of a stator with a rectangular wire being around the insulating bobbin, including:
   a tooth insulating portion insulating the tooth of the stator and the rectangular wire; and
   an extending portion extending from an end portion of the tooth insulating portion along an inner surface of the yoke,
   wherein a guide groove guiding the rectangular wire diagonally relative to a circumferential direction of the tooth insulating portion from an outside of the extending portion is provided in a side of the extending portion on one of axial sides of the stator,
   wherein the teeth are provided of an annular yoke at predetermined intervals in a circumferential direction,
   wherein the insulating bobbin is mounted on each of the teeth, and
   wherein a rectangular wire is wound around the insulating bobbin.

* * * * *